(12) United States Patent
Dautenhahn et al.

(10) Patent No.: US 12,654,248 B2
(45) Date of Patent: Jun. 16, 2026

(54) SYSTEM AND METHOD FOR COMBINED WAVE SOLDER FLOW DESIGN

(71) Applicant: Illinois Tool Works Inc., Glenview, IL (US)

(72) Inventors: Jonathan M. Dautenhahn, Lake Ozark, MO (US); Gregory D. Calvo, Camdenton, MO (US); Gregory Leo Hueste, Camdenton, MO (US); Jackson Schieber, Columbia, MO (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/588,348

(22) Filed: Feb. 27, 2024

(65) Prior Publication Data

US 2025/0269450 A1 Aug. 28, 2025

(51) Int. Cl.
| | |
|---|---|
| *B23K 3/06* | (2006.01) |
| *B23K 1/00* | (2006.01) |
| *B23K 1/08* | (2006.01) |
| B23K 101/42 | (2006.01) |

(52) U.S. Cl.
CPC .......... B23K 3/0653 (2013.01); B23K 1/0016 (2013.01); B23K 1/085 (2013.01); *B23K 2101/42* (2018.08)

(58) Field of Classification Search
None
See application file for complete search history.

(56) References Cited

U.S. PATENT DOCUMENTS

| | | | |
|---|---|---|---|
| 3,151,592 | A | 10/1964 | Wegener |
| 3,604,611 | A | 9/1971 | Lamberty |
| 3,993,235 | A | 11/1976 | Boynton |
| 4,447,001 | A | 5/1984 | Allen et al. |
| 4,465,014 | A | 8/1984 | Bajka et al. |
| 4,465,219 | A | 8/1984 | Kondo |

(Continued)

FOREIGN PATENT DOCUMENTS

| | | |
|---|---|---|
| CN | 1030292 C | 11/1995 |
| CN | 1051434 C | 4/2000 |

(Continued)

OTHER PUBLICATIONS

Dietrich, Aaron, "How electric linear actuators improve automation results", Feb. 17, 2015, http://blog.tolomatic.com/bid/77545/how-electric-linear-actuators-improve-automation-results.

*Primary Examiner* — Devang R Patel
(74) *Attorney, Agent, or Firm* — Lando & Anastasi, LLP

(57) ABSTRACT

A wave soldering station includes a solder pot having a reservoir of solder material, a flow duct positioned in the reservoir of the solder pot, and a wave soldering nozzle assembly coupled to the flow duct. The wave soldering nozzle assembly has a solder distribution baffle configured to create a solder wave, a throttle gate coupled to the flow duct and configured to move from an open position to enable complete flow of solder through the solder distribution baffle and a closed position to inhibit a portion of flow of solder through the solder distribution baffle, and an exit wing coupled to the flow duct and configured to move from a lowered position to enable increased solder flow and a raised position to decrease solder flow. A controller is configured to control the movement of the throttle gate and the exit wing to control the flow of solder.

23 Claims, 17 Drawing Sheets

(56)                 References Cited

U.S. PATENT DOCUMENTS

| | | | |
|---|---|---|---|
| 4,530,457 A | 7/1985 | Down | |
| 4,530,458 A | 7/1985 | Kondo | |
| 4,566,624 A | 1/1986 | Comerford | |
| 4,666,077 A | 5/1987 | Rahn et al. | |
| 4,712,719 A | 12/1987 | Derrico | |
| 4,824,010 A | 4/1989 | Inoue et al. | |
| 4,848,642 A | 7/1989 | Kondo | |
| 4,886,201 A | 12/1989 | Deambrosio et al. | |
| RE33,197 E | 4/1990 | Deambrosio | |
| 5,024,370 A | 6/1991 | Yokota | |
| 5,044,542 A | 9/1991 | Deambrosio | |
| 5,121,874 A | 6/1992 | Deambrosio et al. | |
| 5,156,324 A | 10/1992 | Hueste et al. | |
| 5,228,614 A | 7/1993 | Elliott et al. | |
| 5,388,752 A | 2/1995 | Kawakatsu | |
| 5,409,159 A | 4/1995 | Connors et al. | |
| 5,411,197 A * | 5/1995 | Nakamura | B23K 3/0653 |
| | | | 228/56.2 |
| 5,568,894 A | 10/1996 | Gileta | |
| 5,630,542 A | 5/1997 | Hendrikx | |
| 5,772,101 A | 6/1998 | Nishimura et al. | |
| 5,794,837 A * | 8/1998 | Cottingham | B23K 3/0653 |
| | | | 222/606 |
| 6,415,972 B1 | 7/2002 | Leap | |
| 6,431,431 B2 | 8/2002 | Willis et al. | |
| 6,478,215 B2 * | 11/2002 | Zen | B23K 3/0653 |
| | | | 228/180.1 |
| 6,499,650 B2 | 12/2002 | Takano et al. | |
| 6,726,083 B2 | 4/2004 | Leap | |
| 6,732,903 B2 * | 5/2004 | Wang | B23K 3/0653 |
| | | | 228/37 |
| 7,988,031 B2 | 8/2011 | Nakamura et al. | |
| 9,022,275 B2 | 5/2015 | Hsieh | |
| 9,161,459 B2 | 10/2015 | Dautenhahn | |
| 9,198,300 B2 | 11/2015 | Dautenhahn | |
| 9,370,838 B2 * | 6/2016 | Hueste | B23K 1/085 |
| 9,427,819 B2 | 8/2016 | Dautenhahn | |
| 10,029,326 B2 * | 7/2018 | Dautenhahn | B23K 3/0638 |
| 10,780,516 B2 * | 9/2020 | Dautenhahn | B23K 1/085 |
| 11,130,188 B2 * | 9/2021 | Sugihara | B23K 3/08 |
| 11,389,888 B2 * | 7/2022 | Dautenhahn | B23K 1/0016 |
| 12,356,555 B2 * | 7/2025 | Dautenhahn | B23K 1/203 |
| 2001/0020637 A1 * | 9/2001 | Zen | B23K 1/085 |
| | | | 228/42 |
| 2001/0030220 A1 | 10/2001 | Willis et al. | |
| 2002/0036223 A1 | 3/2002 | Saito | |
| 2002/0179693 A1 | 12/2002 | Kawashima et al. | |
| 2003/0066866 A1 | 4/2003 | Takaguchi et al. | |
| 2003/0116607 A1 | 6/2003 | Wang et al. | |
| 2004/0211816 A1 | 10/2004 | Ogawa | |
| 2005/0006435 A1 | 1/2005 | Diehm et al. | |
| 2006/0186183 A1 | 8/2006 | Morris | |
| 2010/0059575 A1 | 3/2010 | Isler et al. | |
| 2010/0065610 A1 | 3/2010 | Szymanowski | |
| 2010/0163599 A1 | 7/2010 | Zen et al. | |
| 2011/0226843 A1 | 9/2011 | Yanaros et al. | |
| 2013/0206817 A1 | 8/2013 | Tavares et al. | |
| 2016/0052074 A1 | 2/2016 | Hueste | |
| 2017/0072492 A1 | 3/2017 | Hashimoto et al. | |
| 2018/0111211 A1 | 4/2018 | Dautenhahn et al. | |
| 2019/0039159 A1 * | 2/2019 | Suzuki | B23K 1/0016 |
| 2019/0381590 A1 | 12/2019 | Dautenhahn et al. | |
| 2022/0048127 A1 | 2/2022 | Dautenhahn | |

FOREIGN PATENT DOCUMENTS

| | | |
|---|---|---|
| CN | 1620228 A | 5/2005 |
| CN | 1225154 C | 10/2005 |
| CN | 1748872 A | 3/2006 |
| CN | 102485394 A | 6/2012 |
| CN | 103111713 A | 5/2013 |
| CN | 104249208 A | 12/2014 |
| CN | 104684273 A | 6/2015 |
| CN | 104999149 A | 10/2015 |
| CN | 105397233 A | 3/2016 |
| CN | 105658366 A | 6/2016 |
| CN | 106660152 A | 5/2017 |
| CN | 106925857 A | 7/2017 |
| CN | 106975816 A | 7/2017 |
| CN | 110385499 A | 10/2019 |
| CN | 113857614 A | 12/2021 |
| DE | 3309839 A1 | 10/1983 |
| DE | 19541340 A1 | 5/1997 |
| DE | 4314241 C2 | 12/1999 |
| EP | 0278166 A2 | 8/1988 |
| EP | 0377336 A2 | 7/1990 |
| EP | 2928634 B1 | 2/2018 |
| EP | 3437775 A1 | 2/2019 |
| FR | 2572969 A1 | 5/1986 |
| JP | 63-242466 A | 10/1988 |
| JP | H0297956 U | 8/1990 |
| JP | H06000633 A | 1/1994 |
| JP | H09283912 A | 10/1997 |
| JP | H1154902 A | 2/1999 |
| JP | H1174639 A | 3/1999 |
| JP | 2000-196230 A | 7/2000 |
| JP | 2001251047 A | 9/2001 |
| JP | 2002192340 A | 7/2002 |
| JP | 2004311852 A | 11/2004 |
| JP | 2006080439 A | 3/2006 |
| JP | 5910784 B1 | 4/2016 |
| JP | 6852710 B2 | 3/2021 |
| JP | 2023-538005 A | 9/2023 |
| WO | 2010087374 A1 | 8/2010 |
| WO | 2015040691 A1 | 3/2015 |
| WO | 2019131080 A1 | 7/2019 |
| WO | 2019240932 A1 | 12/2019 |

* cited by examiner

SYSTEM AND METHOD FOR COMBINED WAVE SOLDER FLOW DESIGN

BACKGROUND OF DISCLOSURE

1. Field of Disclosure

The present disclosure relates generally to apparatus and methods for manufacturing printed circuit boards and for assisting a process of soldering metals to integrated circuit boards, and more particularly to a wave soldering machine and related method having a wave solder nozzle assembly that is configured to control flow of solder.

2. Discussion of Related Art

In the fabrication of printed circuit boards, electronic components can be mounted to a printed circuit board by a process known as "wave soldering." In a typical wave solder machine, a printed circuit board (sometimes referred to as a "PCB") is moved by a conveyor on an inclined path past a fluxing station, a pre-heating station, and finally a wave soldering station. At the wave soldering station, a wave of solder is caused to well upwardly (by means of a pump) through a wave solder nozzle and contact portions of the printed circuit board to be soldered.

Typical wave solder nozzles have nozzles configured to control the flow of solder generated by the wave soldering machine. The process of adjusting the solder flow can be difficult and imposes risks to operators tasked with making such adjustments within a solder pot filled with molten solder. Minimizing dross created by the solder flow over the nozzle is also desired.

SUMMARY OF DISCLOSURE

One aspect of the present disclosure is directed to a wave soldering machine to perform a wave soldering operation on a printed circuit board. In one embodiment, the wave soldering machine comprises a housing and a conveyor coupled to the housing. The conveyor is configured to deliver a printed circuit board through the housing. The wave soldering machine further comprises a wave soldering station coupled to the housing. The wave soldering station includes a solder pot having a reservoir of solder material, a flow duct positioned in the reservoir of the solder pot, and a wave soldering nozzle assembly coupled to the flow duct. The wave soldering nozzle assembly has a solder distribution baffle configured to create a solder wave, a throttle gate coupled to the flow duct and configured to move from an open position to enable complete flow of solder through the solder distribution baffle and a closed position to inhibit a portion of flow of solder through the solder distribution baffle, and an exit wing coupled to the flow duct and configured to move from a lowered position to enable increased solder flow and a raised position to decrease solder flow. The wave soldering machine further comprises a controller coupled to the wave soldering station to control the movement of the throttle gate and the exit wing to control the flow of solder.

Embodiments of the wave soldering machine further may include configuring the wave soldering nozzle assembly with a core frame supported by the flow duct. The core frame may be configured to support the solder distribution baffle. The exit wing may be rotatable about a hinge with respect to the nozzle core frame to move the exit wing between the lowered position and the raised position. The wave solder nozzle assembly further may include an exit wing actuator connected to the exit wing and coupled to the controller. The exit wing actuator may be configured to adjust the position of the exit wing between the lowered position and the raised position. The exit wing actuator may be connected to the exit wing by a linkage, with the linkage including at least one rotating link having a first end rotatably coupled to an end of the exit wing and a second end that is rotatably coupled to an actuator arm of the exit wing actuator. The linkage further may include a cross bar extending perpendicularly to and being rotatably coupled to the at least one rotating link, and at least one connecting link coupling the cross bar to the actuator arm and extending perpendicularly to cross bar. The at least one connecting link may be connected to the actuator arm by an actuator block. The throttle gate may include a plate and a hinge pin hingedly secured to the nozzle core frame. The wave soldering nozzle assembly further may include a throttle gate actuator configured to move the throttle gate between the open position and the closed position. The wave soldering nozzle assembly further may include a link secured to a movement mechanism that is coupled to the throttle plate. The movement mechanism may be coupled to an arm secured to the hinge pin of the throttle gate.

Another aspect of the present disclosure is directed to a wave soldering station of a wave solder machine configured to perform a wave soldering operation on a printed circuit board. In one embodiment, the wave soldering station comprises a solder pot having a reservoir of solder material, a flow duct positioned in the reservoir of the solder pot, and a wave soldering nozzle assembly coupled to the flow duct. The wave soldering nozzle assembly has a solder distribution baffle configured to create a solder wave, a throttle gate coupled to the flow duct and configured to move from an open position to enable complete flow of solder through the solder distribution baffle and a closed position to inhibit a portion of flow of solder through the solder distribution baffle, and an exit wing coupled to the flow duct and configured to move from a lowered position to enable increased solder flow and a raised position to decrease solder flow. A controller, coupled to the wave soldering station, is configured to control the movement of the throttle gate and the exit wing to control the flow of solder.

Embodiments of the wave soldering station further may include configuring the wave soldering nozzle assembly with a core frame supported by the flow duct. The core frame may be configured to support the solder distribution baffle. The exit wing may be rotatable about a hinge with respect to the nozzle core frame to move the exit wing between the lowered position and the raised position. The wave solder nozzle assembly further may include an exit wing actuator connected to the exit wing and coupled to the controller. The exit wing actuator may be configured to adjust the position of the exit wing between the lowered position and the raised position. The exit wing actuator may be connected to the exit wing by a linkage, with the linkage including at least one rotating link having a first end rotatably coupled to an end of the exit wing and a second end that is rotatably coupled to an actuator arm of the exit wing actuator. The linkage further may include a cross bar extending perpendicularly to and being rotatably coupled to the at least one rotating link, and at least one connecting link coupling the cross bar to the actuator arm and extending perpendicularly to cross bar. The at least one connecting link may be connected to the actuator arm by an actuator block. The throttle gate may include a plate and a hinge pin hingedly secured to the nozzle core frame. The wave soldering nozzle assembly further may include a throttle gate actuator configured to move the throttle gate between the open position and the closed position. The wave soldering nozzle assembly further may include a link secured to a movement mechanism that is coupled to the throttle plate. The movement mechanism may be coupled to an arm secured to the hinge pin of the throttle gate.

Yet another aspect of the present disclosure is directed to a method of adjusting a flow of a solder wave of a wave solder nozzle assembly of a wave soldering machine. In one embodiment, the method comprises: delivering solder material to a wave solder nozzle assembly including a solder distribution baffle configured to create a solder wave, a throttle gate coupled to the flow duct and configured to move from an open position to enable complete flow of solder through the solder distribution baffle and a closed position to inhibit a portion of flow of solder through the solder distribution baffle, and an exit wing coupled to the flow duct and configured to move from a lowered position to enable increased solder flow and a raised position to decrease solder flow; adjusting a flow of the solder wave by a throttle gate actuator connected to the throttle gate to adjust a position of the throttle gate and an exit wing actuator coupled to the exit wing to adjust a position of the exit wing with respect to the nozzle core frame; and performing a wave soldering operation on a printed circuit board.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
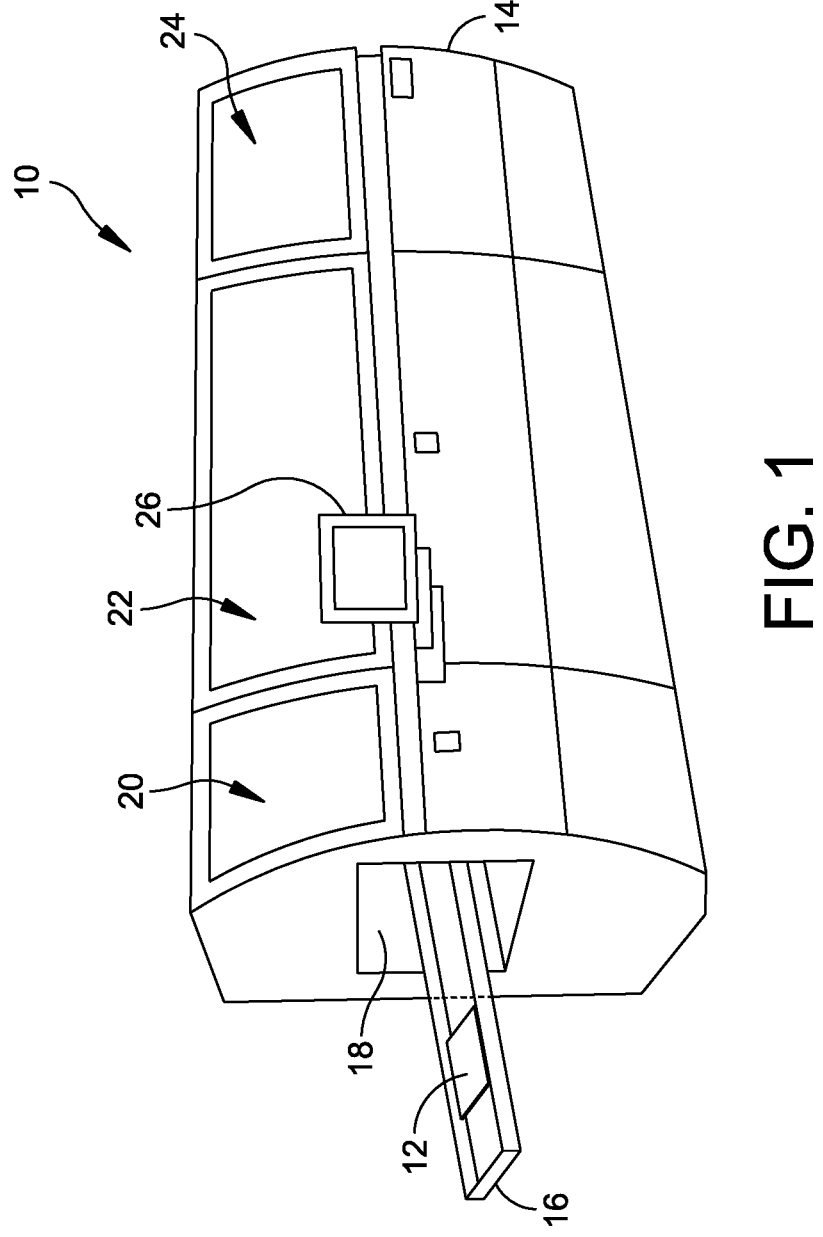
FIG. 1 is a perspective view of a wave soldering machine.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the present disclosure are directed to controlling the flow of molten solder over a nozzle in order to optimize the flow of the solder wave. One objective is to provide the ability to adjust the contact of the printed circuit board with the solder wave. Another objective is to adjust the solder flow at an exit of the solder wave to optimize soldering characteristics. An additional objective is to automate these adjustments and allow for computer control to eliminate the need for human intervention when adjustment is needed based on the product being processed.

For purposes of illustration, and with reference to FIG. 1, embodiments of the present disclosure will now be described with reference to a wave soldering machine, generally indicated at 10, which is used to perform a solder application on a printed circuit board 12. The wave soldering machine 10 is one of several machines in a printed circuit board fabrication/assembly line. As shown, the wave soldering machine 10 includes a housing or frame 14 adapted to house the components of the machine. The arrangement is such that a conveyor 16 delivers printed circuit boards to be processed by the wave soldering machine 10. Upon entering the wave soldering machine 10, each printed circuit board 12 travels along an inclined path (e.g., six degrees with respect to horizontal) along the conveyor 16 through a tunnel 18, which includes a fluxing station, generally indicated at 20, and a pre-heating station, generally indicated at 22, to condition the printed circuit board for wave soldering. Once conditioned (i.e., heated), the printed circuit board 12 travels to a wave soldering station, generally indicated at 24, to apply solder material to the printed circuit board. A controller 26 is provided to automate the operation of the several stations of the wave soldering machine 10, including but not limited to the fluxing station 20, the pre-heating station 22, and the wave soldering station 24, in the well-known manner.

Figure 2:
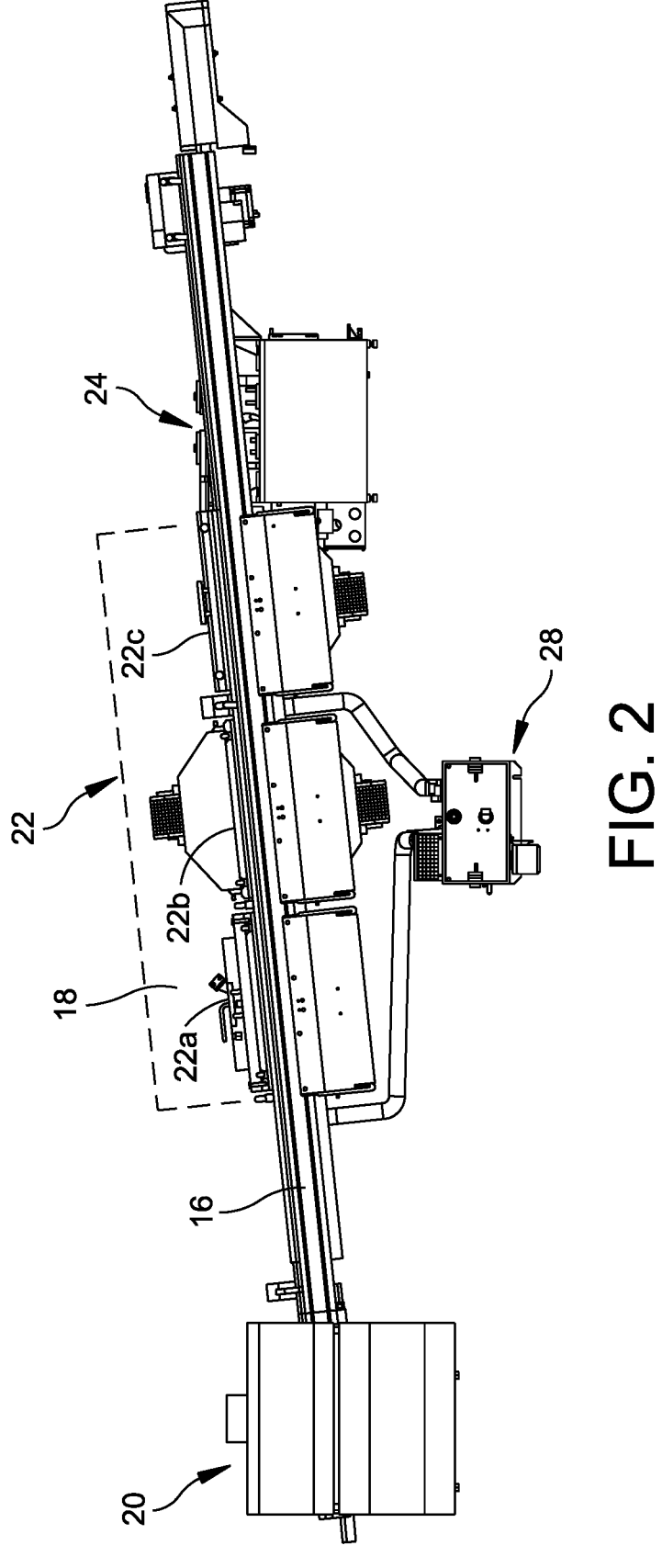
FIG. 2 is a side elevational view of the wave soldering machine with external packaging removed to reveal internal components of the wave soldering machine.

Referring to FIG. 2, the fluxing station 20 is configured to apply flux to the printed circuit board as it travels on the conveyor 16 through the wave soldering machine 10. The pre-heating station includes several pre-heaters (e.g., pre-heaters 22a, 22b and 22c), which are designed to incrementally increase the temperature of the printed circuit board as it travels along the conveyor 16 through the tunnel 18 to prepare the printed circuit board for the wave soldering process. As shown and described in greater detail below, the wave soldering station 24 includes a wave solder nozzle assembly in fluid communication with a reservoir of solder material. A pump is provided within the reservoir to deliver molten solder material to the wave soldering nozzle assembly from the reservoir. Once soldered, the printed circuit board exits the wave soldering machine 10 via the conveyor 16 to another station provided in the fabrication line, e.g., a pick-and-place machine.

In some embodiments, the wave soldering machine 10 further may include a flux management system, generally indicated at 28, to remove volatile contaminants from the tunnel 18 of the wave soldering machine. As shown in FIG. 2, the flux management system 28 is positioned below the pre-heating station 22. In one embodiment, the flux management system is supported by the housing 14 within the wave soldering machine, and is in fluid communication with the tunnel 18, which is schematically illustrated in FIG. 2. The flux management system 28 is configured to receive contaminated gas from the tunnel 18, treat the gas, and return clean gas back to the tunnel. The flux management system 28 is particularly configured to remove volatile contaminants from the gas, especially in inert atmospheres.

Embodiments of the present disclosure are directed to varying the contact length (also referred to as "dwell time"), which is the amount of time the PCB is in contact with the solder wave. The many varieties of size, mass, shape, composition, etc. of the PCB push the envelope of process windows; thus, a "one size fits all" approach to dwell time is not always the most effective approach. A soldering process that is not effectively optimized can lead to soldering defects that result in rework or scrap.

Further, embodiments of the present disclosure are directed to optimizing wave solder flow with respect to the printed circuit board 12. It is desirable when processing the printed circuit board 12 to control the velocity of flow of solder (Vs) so that it approximates the velocity of the printed circuit board 12 (Vpcb) as it exits the solder wave. When these two velocities are equal the potential for soldering defects, particularly solder bridging, is greatly reduced. When velocities are not optimized, the resulting defects may require rework or scrap.

Figure 3:
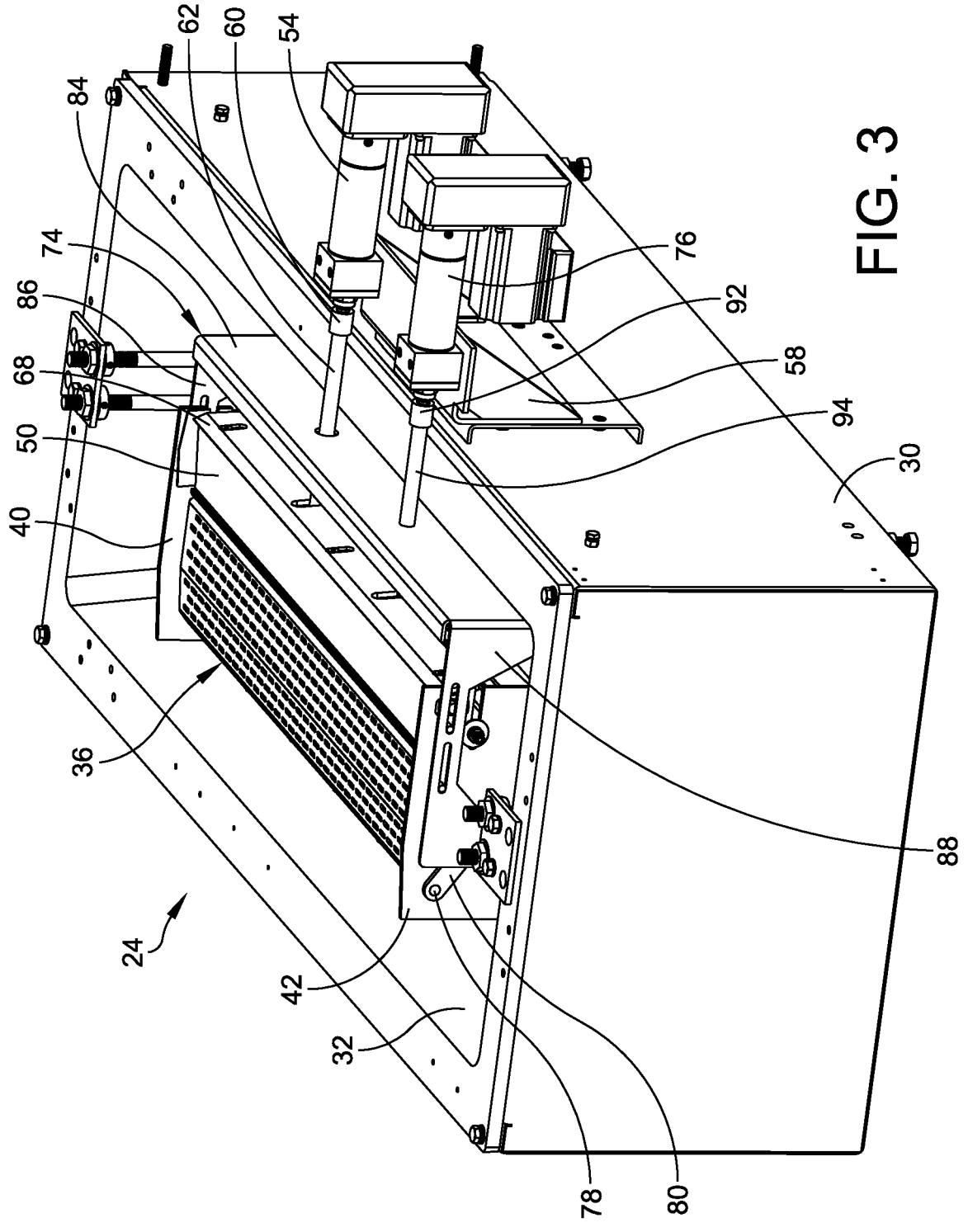
FIG. 3 is a perspective view of a wave soldering station of an embodiment of the present disclosure.
Figure 4:
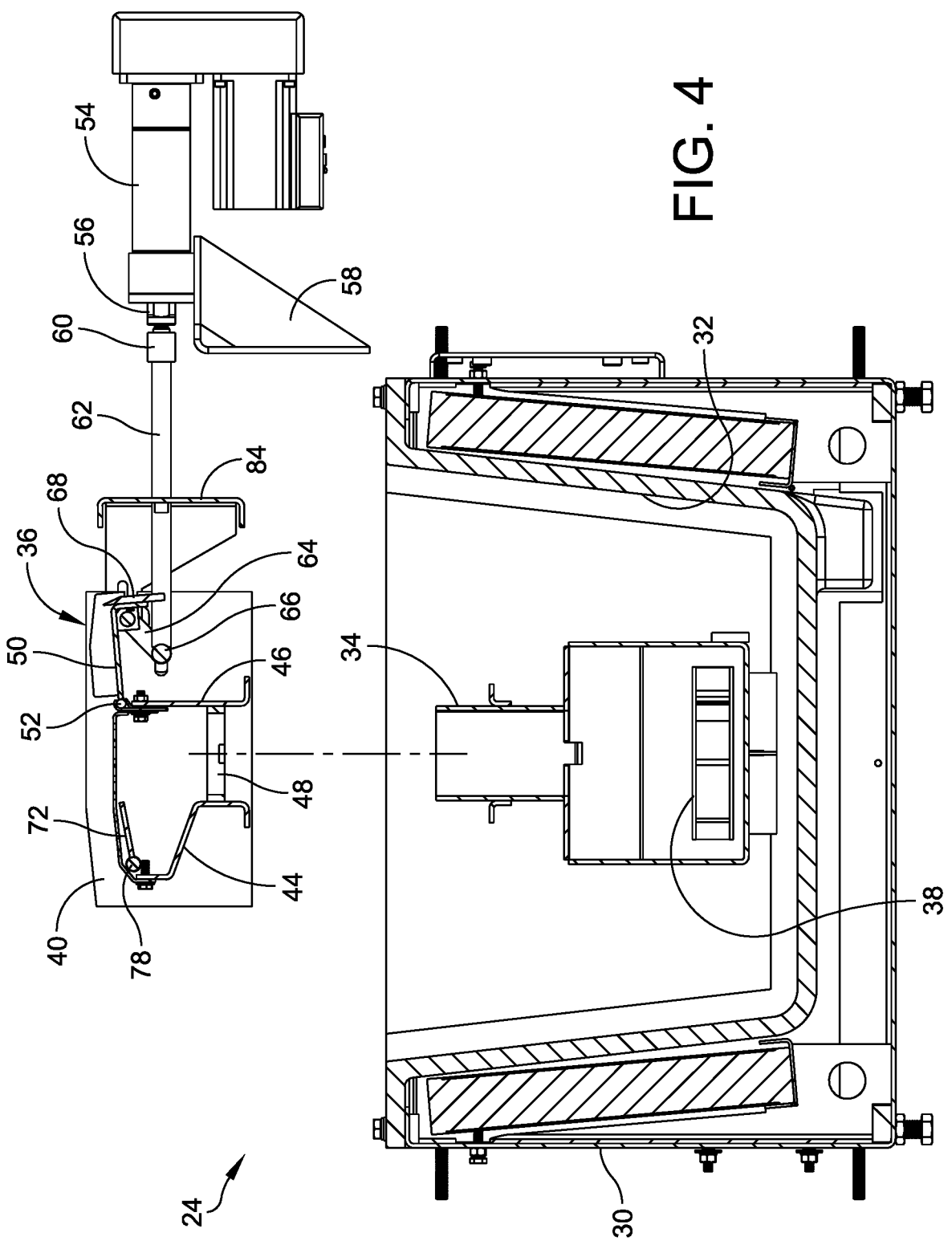
FIG. 4 is a cross-sectional view of the wave soldering station with a wave soldering assembly separated from a solder pot of the wave soldering station.

Referring to FIGS. 3 and 4, in one embodiment, the wave soldering station 24 includes a solder pot 30 that defines a reservoir 32 configured to contain molten solder. In one embodiment, the solder pot 30 is a box-shaped structure that supports the components of the wave soldering station 24 including a flow duct 34 having one or more chambers within the reservoir 32. The flow duct 34 is designed to deliver pressurized molten solder to an opening or nozzle of a wave soldering nozzle assembly, which is generally indicated at 36. As will be described in greater detail below, the wave soldering nozzle assembly 36 is configured to channel the molten solder to the bottom of the printed circuit board 12 and provides for smooth flow of solder back into the reservoir 32. Specifically, the wave soldering nozzle assembly 36 is capable of adjusting a height and a width of the solder wave when performing a wave soldering operation.

The wave soldering station 24 further includes a pump impeller 38 positioned within the reservoir 32 of the solder pot 30 adjacent an inlet provided in the flow duct 34. The pump impeller 38 pressurizes the molten solder in the reservoir 32 to pump the molten solder vertically within the reservoir to the wave soldering nozzle assembly 36. In one embodiment, the pump impeller 38 is a centrifugal pump that is suitably sized to pump the molten solder to the nozzle of the wave soldering nozzle assembly 36. The wave soldering nozzle assembly 36 is configured to generate a solder wave that is provided to attach components on the circuit board 12 in the manner described herein, and to optimize a dwell time during processing.

Exit Wing

Figure 5:
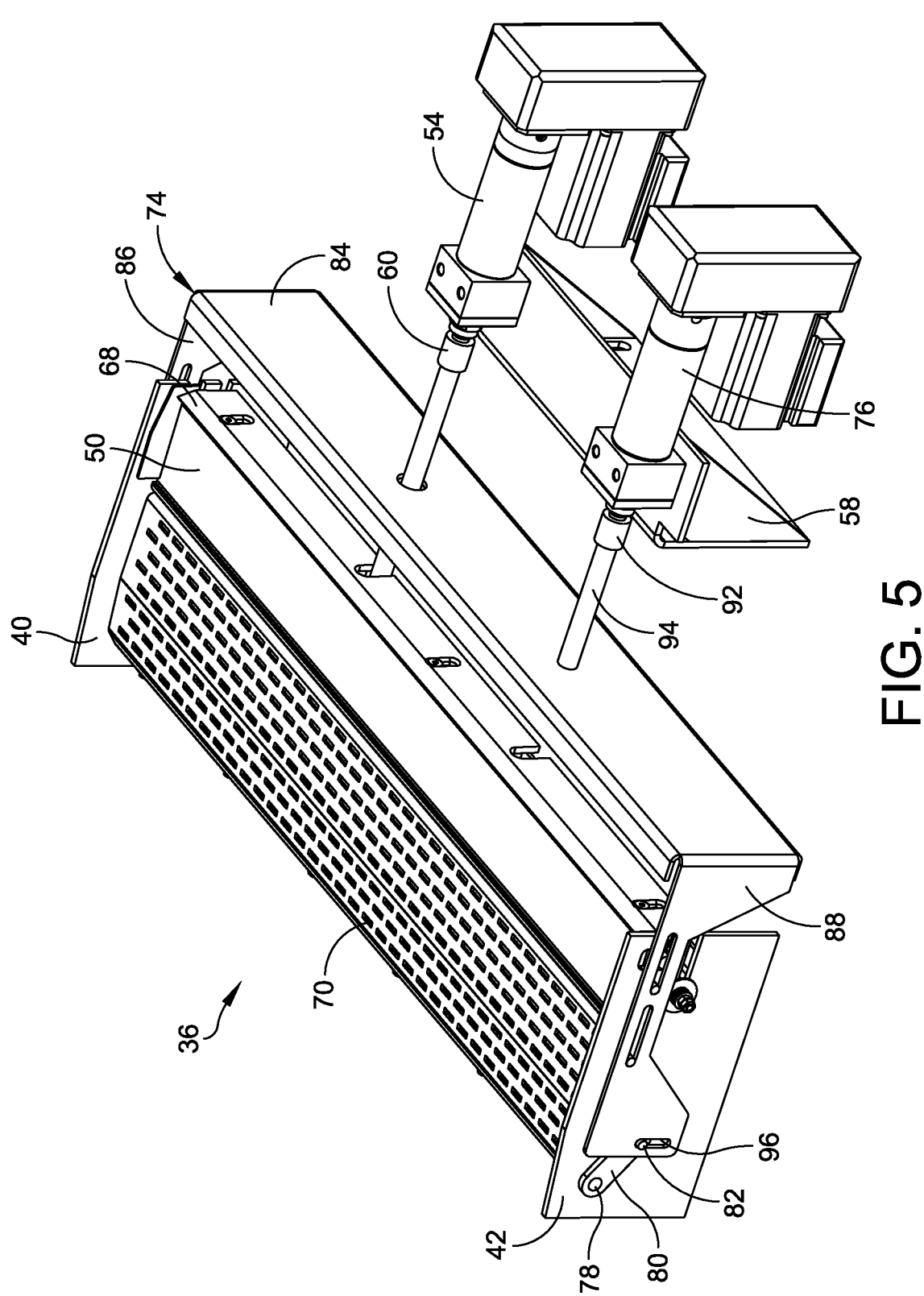
FIG. 5 is a perspective view of the wave soldering assembly.
Figure 6:
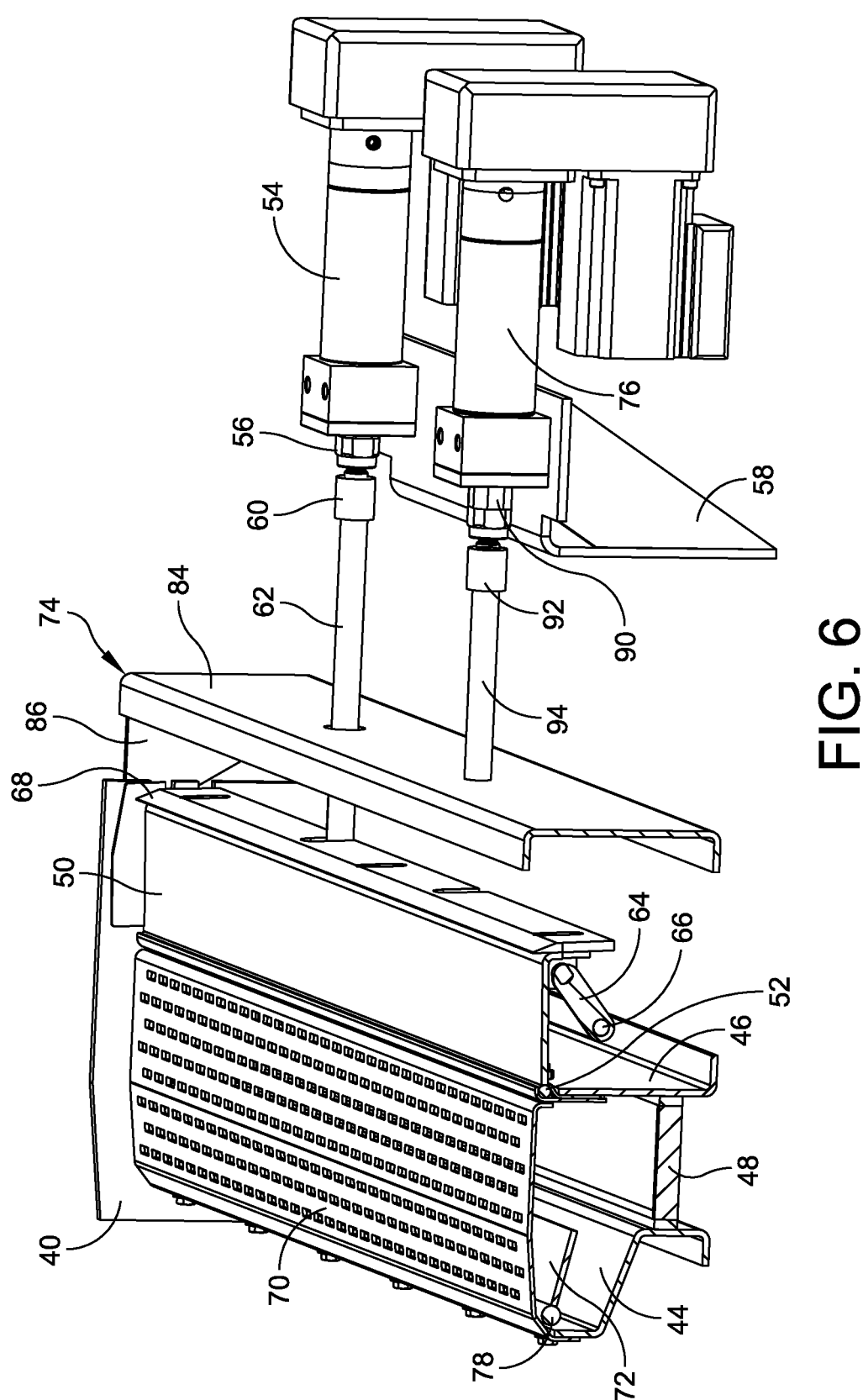
FIG. 6 is another perspective view of the wave soldering assembly.
Figure 7:
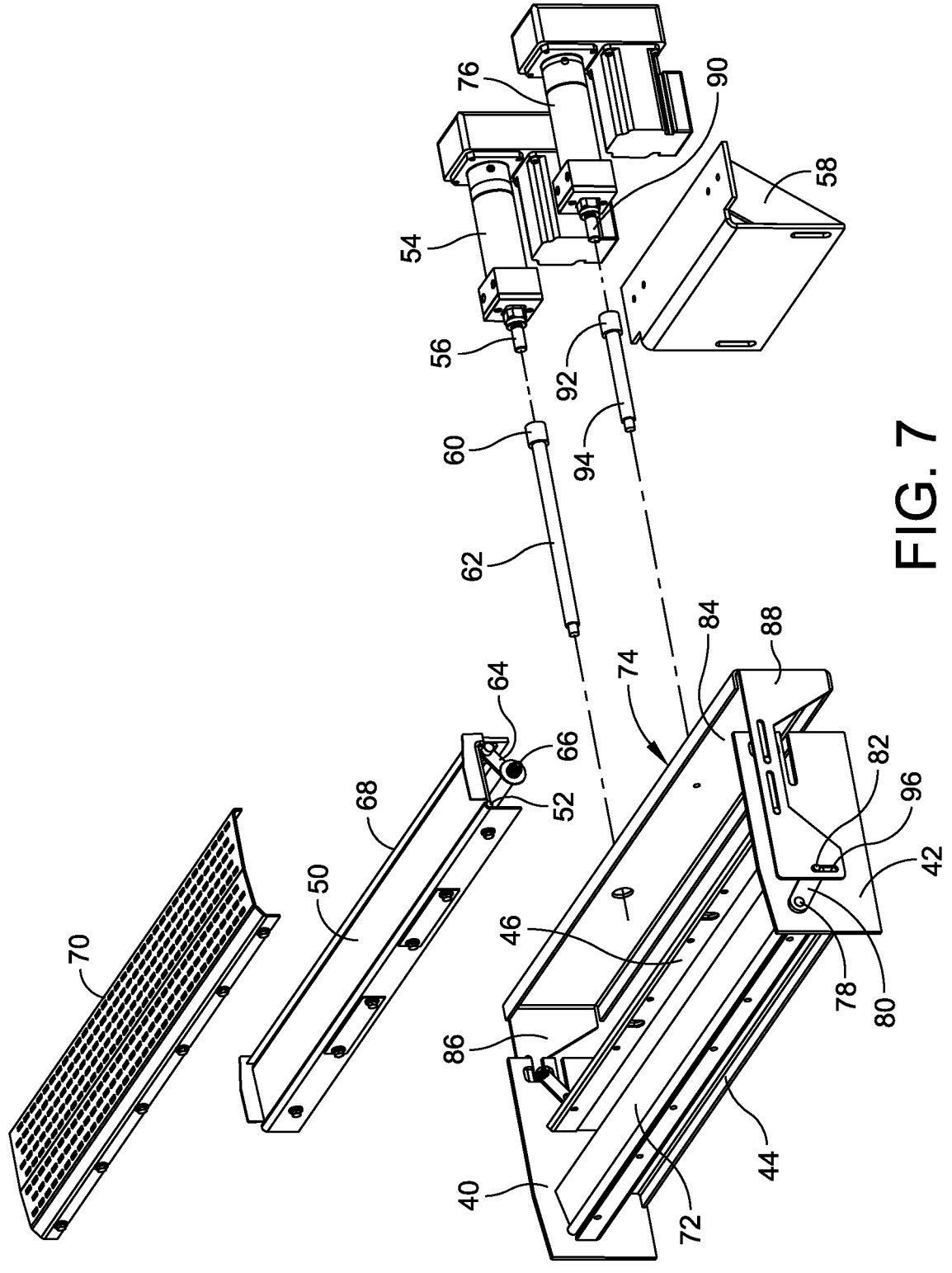
FIG. 7 is an exploded perspective view of the wave soldering assembly.

Referring additionally to FIGS. 5-7, the wave solder nozzle assembly 36 includes a nozzle core frame having two end walls 40, 42, a first longitudinal side wall 44 and a second longitudinal side wall 46 that each extends between the end walls. As shown, the nozzle core frame further may include several cross support elements, indicated at 48, that extend between the first longitudinal side wall 44 and the second longitudinal side wall 46. The nozzle core frame also directs the solder flow through a nozzle defined between the first and second longitudinal side walls.

The nozzle assembly 36 further includes an exit wing 50 to control the solder flow over the back of the nozzle of the solder wave generated by the wave solder machine 10. To allow for an adjustment of the flow of the solder wave exiting the nozzle of the nozzle core frame, the exit wing 50 is hingedly secured to the second longitudinal side wall 46 of the nozzle core frame by a hinge 52. The exit wing 50 is rotatable about the hinge 52 by an actuator 54 via a linkage. The actuator 54 is sometimes referred to herein as a first actuator or an exit wing actuator. As described in more detail below, the position of the exit wing 50 relative to the nozzle core frame can be controlled in real-time by controlling the longitudinal displacement of an actuator arm 56 of the actuator 54 and thus the flow of the solder wave over the back of the nozzle to decrease or increase by raising and lowering the exit wing, respectively.

The actuator 54 is secured to the solder pot 30 by an actuator support frame 58, which is secured to a side wall of the solder pot 30 by suitable fasteners, such as bolts. The actuator support frame 58 could alternately be secured to the solder pot 30 by another method, such as welding or rivets. As shown, the actuator 54 is secured to the actuator support frame 58, which is configured to support the actuator firmly relative to the solder pot 30. The actuator 54 is positioned next to the wave solder nozzle assembly 36 and forms part of the assembly to adjust a position of the exit wing 50 of the wave solder nozzle assembly 36 with respect to the nozzle core frame via the linkage coupled to the exit wing and to the actuator. The actuator 54 includes the actuator arm 56 that is coupled to the linkage by an actuator block 60. The linkage is described in more detail below.

In one embodiment, the actuator 54 is a linear actuator, so the actuator arm 56 moves in a longitudinal direction. The actuator block 60 connects the actuator arm 56 to a connecting link 62 of the linkage to transfer movement from the actuator arm to the connecting link. Thus, longitudinal movement of the actuator arm 56 moves the actuator block 60 and the connecting link 62 in the same longitudinal direction as the actuator arm. In some embodiments, the actuator 54 and the connecting link 62 are oriented so the actuator arm moves the connecting link in a horizontal direction. In certain embodiments, the actuator 54 includes an electromechanical actuator that provides movement for the adjustment of the position of the exit wing 50. The actuator 54 is driven by computer controlled machine software (supported by the controller 26) and incorporates an encoder that can relay position indication to the machine software. Via the controller 26, the actuator 54 can be controlled in real-time to achieve a desired position of the exit wing 50. The controller 26 is in communication with the actuator 54 and is configured to cause the actuator to adjust the position of the exit wing 50 during operation of the wave soldering machine 10. In turn, the actuator 54 is configured to receive commands from the controller 26 to cause the actuator 54 to adjust the position of the exit wing 50 during operation of the wave soldering machine 10.

In one embodiment, the exit wing 50 includes a first end that is coupled to the second longitudinal side wall 46 of the nozzle core frame by the hinge 52 and a second end that is coupled to the actuator 54 via a rotating link 64 of the linkage so the actuator can cause the second end of the exit wing to rotate about the hinge at the first end of the exit wing. Rotating the exit wing 50 about the hinge 52 changes the flow of the solder wave passing over the exit wing. In particular, rotating the exit wing 50 so the second end of the exit wing moves upwardly to a raised position causes the flow of the solder wave over the exit wing to decrease while rotating the exit wing so the second end of the exit wing moves downwardly to a lowered position causes the flow of the solder wave over the exit wing to increase.

As mentioned above, the linkage allows the actuator 54 to adjust a position of the exit wing 50 with respect to the nozzle core frame. In particular, the linkage allows longitudinal movement of the actuator arm 56 of the actuator 54 to adjust an angle of an upper surface of the exit wing 50 with respect to a horizontal direction. In one embodiment, the linkage includes the rotating link 64, a cross bar 66, and the connecting link 62. The rotating link 64 is coupled to the second end of the exit wing 50 by the cross bar 66, which is in turn coupled to the actuator block 60 by the connecting link 62.

The rotating link 64 has a first end that is rotatably coupled to the second end of the exit wing 50 and a second end that is rotatably coupled to the cross bar 66. The cross bar 66 extends perpendicularly to the rotating link 64. The connecting link 62 has a first end that is coupled to the cross bar 66 and a second end that is coupled to the actuator block 60. The connecting link 62 extends perpendicularly to the cross bar 66 and parallel to the actuator arm 56. When the upper surface of the exit wing 50 extends substantially in a horizontal direction, the cross bar 66 is located beneath the exit wing and longitudinally between the first end of the exit wing and the second end of the exit wing.

The longitudinal displacement of the actuator arm 56 is able to cause the exit wing 50 to rotate about the hinge 52. An axial direction of the actuator arm 56 is parallel with an axial direction of the connecting link 62. Thus, the actuator arm 56 is configured to move the connecting link 62 along the horizontal direction along the axis of the direction of the actuator arm 56. Because the cross bar 66 is coupled to the connecting link 62, extension or retraction of the actuator arm 56 results in translation of the cross bar. Because the rotating link 64 is rotatably coupled to the cross bar 66 and because the actuator 54 and the wave solder assembly 36 are secured to the solder pot 30, this translation of the cross bar results in a rotation of the exit wing 50.

Figure 8:
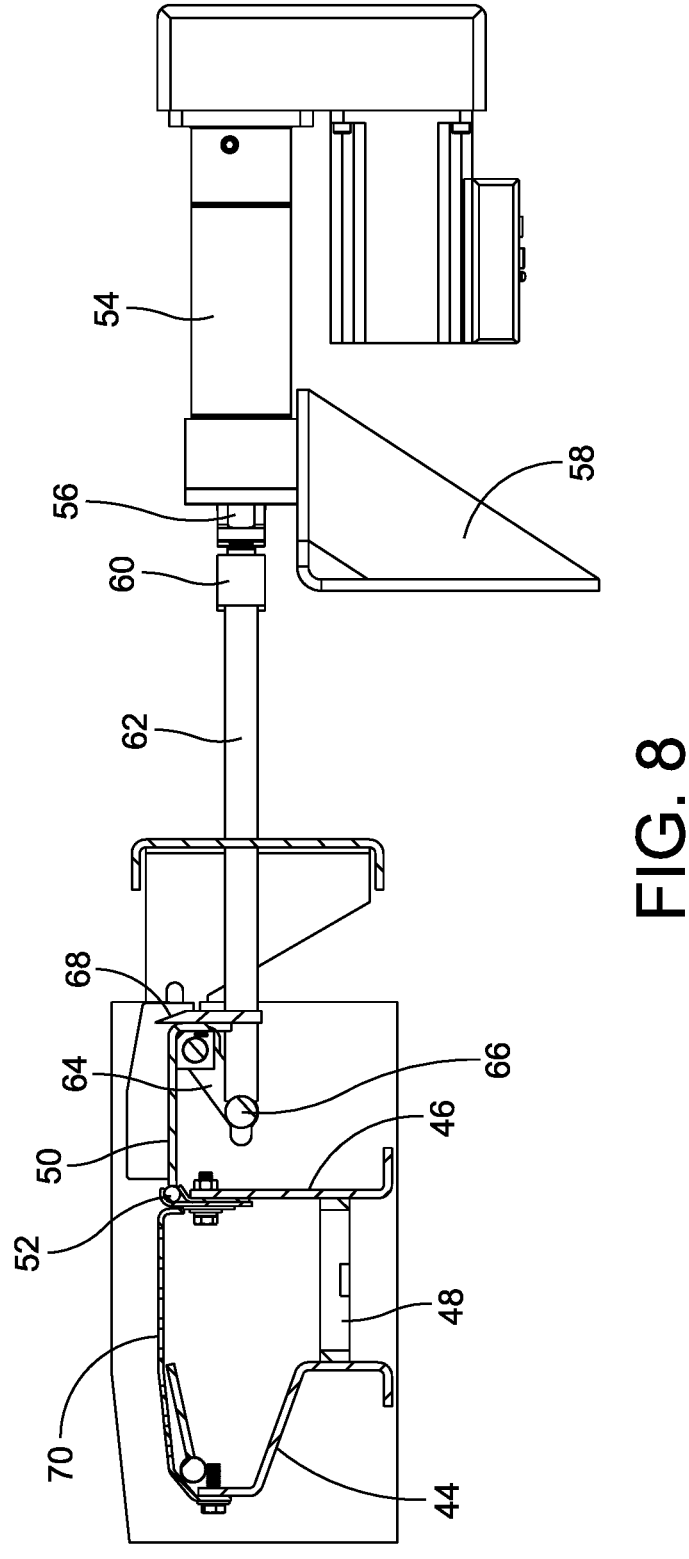
FIG. 8 is a side view of the wave soldering assembly showing an exit wing in a lowered position.
Figure 9:
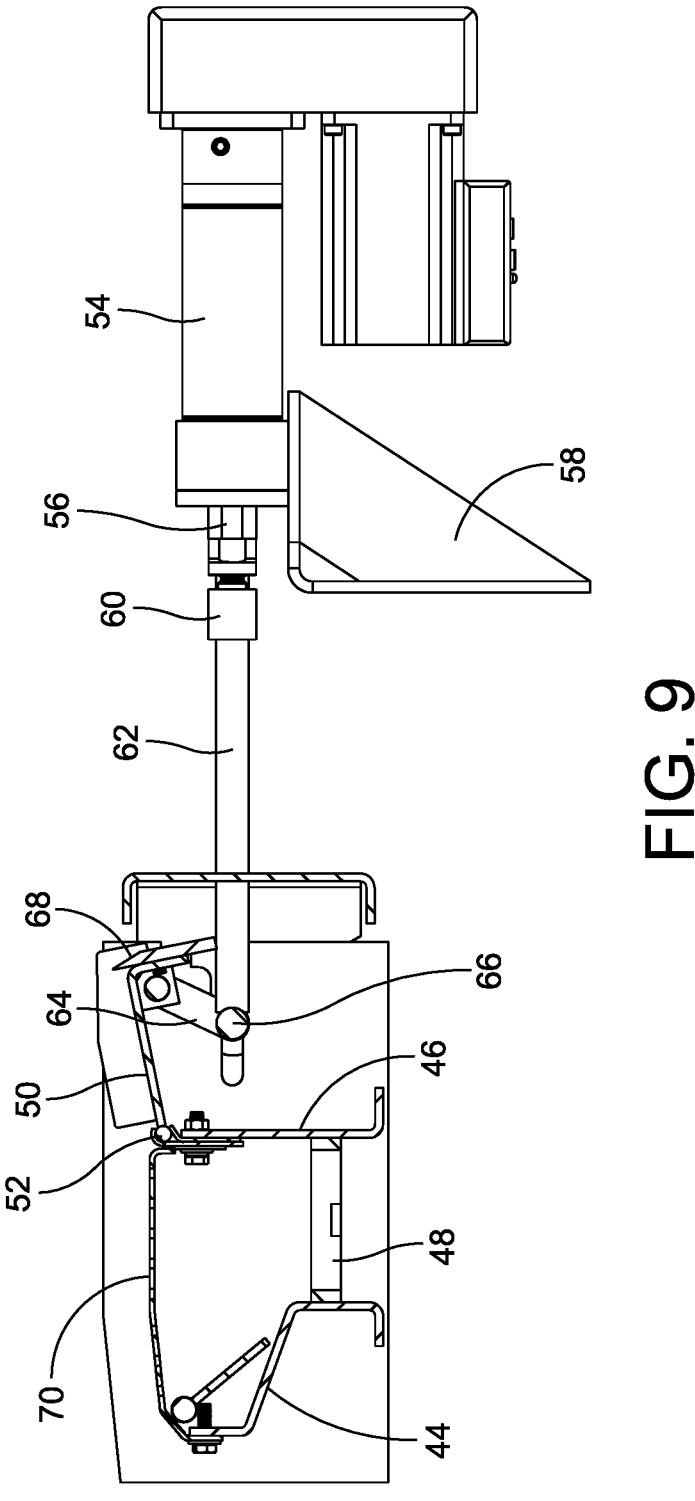
FIG. 9 is a side view of the wave soldering assembly showing the exit wing in a raised position.

Referring to FIGS. 8 and 9, the actuator arm 56 is shown in an extended position in FIG. 8 and in a retracted position in FIG. 9. The second end of the exit wing 50 is shown to be lower (lowered position) in FIG. 8 than in FIG. 9 (raised position). A back gate 68 is secured to the second end of the exit wing 50. The controller 26 is configured to adjust the orientation of the exit wing 50 to change the flow of solder over the back gate 68 of the exit wing. The controller 26 is configured to achieve optimum soldering characteristics of the wave nozzle assembly 36. Optimal soldering character-istics are achieved when there is no flow over the back gate 68 when the conveyor 16 is not carrying parts to be soldered, such as PCBs, over the wave solder assembly 36. However, once a PCB carried by the conveyor 16 enters the solder wave, the solder starts to flow over the back gate 68 at the same velocity as the velocity of the PCB along the conveyor 16. Once the PCB exits the wave, the solder flow over the back gate stops again.

Although the above description of solder flow relates to PCBs being carried by the conveyor 16, similar solder flow would occur for other parts to be soldered that are carried by the conveyor 16 over the wave solder nozzle assembly 36.

The orientations of the exit wing 50 that are shown in FIGS. 8 and 9 are just two examples of orientations of the exit wing. The rotational range of the exit wing 50 may be selected according to the desired performance parameters of the system, such as the desired range of wave heights. In various embodiments, the range of rotation of the exit wing 50 can extend beyond the orientations shown in FIGS. 8 and 9.

Throttle Gate

Referring back to FIGS. 5-7, the wave soldering nozzle assembly 36 further includes an elongate solder distribution baffle 70 that is secured to the first longitudinal side wall 44 of the nozzle core frame. The solder distribution baffle 70 is secured to the first longitudinal side wall 44 with screws, e.g., through openings located at the load side of the baffle. In one embodiment, one side, i.e., the load side, of the solder distribution baffle 70 is secured to or formed integrally with the first longitudinal side wall 44, and the other side, i.e., the unload side, of the solder distribution baffle is secured to or integrally formed with the second longitudinal side wall 46. In one embodiment, the solder distribution baffle 70 includes a pattern of elongate openings to enable molten solder to flow through the body of the solder distribution baffle.

The wave soldering nozzle assembly 36 further includes a throttle gate 72, which is hingedly secured to the end walls 40, 42 of the nozzle core frame. As shown, the throttle gate 72 is secured to the nozzle core frame at the load side of the wave soldering nozzle assembly 36 and configured to selec-tively block a portion of the solder distribution baffle 70 to reduce the amount of solder that enters the solder distribu-tion baffle. As shown, the throttle gate 72 is located at the load side of the nozzle assembly, but it is understood that this could be positioned in other locations, such as the middle or unload side. The throttle gate 72 is coupled to a movement mechanism, generally indicated at 74, which in turn is coupled to an actuator 76 to move the throttle gate 72 between an open position and a closed position. The actuator 76 is sometimes referred to herein as a second actuator or a throttle gate actuator.

Specifically, the throttle gate 72 includes one or more plates disposed along a length of the solder distribution baffle 70. In one embodiment, a single plate is sized to block or otherwise prevent the flow of solder through openings in the solder distribution baffle along the length of the solder distribution baffle. The throttle gate 72 is hingedly secured to the end walls 40, 42 of the nozzle core frame by a hinge pin 78. As best shown in FIG. 5, an end of the hinge pin 78 extends through an opening of its respective end wall 42 of the nozzle core frame. The hinge pin 78 is fixedly secured to an arm 80 having an outwardly extending pin 82. The arrangement is such that when rotating the throttle gate 72, the arm 80 rotates about an axis of the hinge pin 78. The other end of the hinge pin may or may not include a similar arm.

The movement mechanism 74 is a generally U-shaped structure having a front wall 84 that faces the second longitudinal side wall 46 of the nozzle core frame and two side walls 86, 88 that face respective end walls 40, 42 of the nozzle core frame, respectively. The movement mechanism 74 is designed to move laterally (horizontally) with respect to the nozzle core frame. The front wall 84 includes an opening that is configured to receive the connecting link 62 coupled to the exit wing actuator 54. The movement mechanism 24 is coupled to the throttle gate actuator 76, which is configured to provide lateral movement of the movement mechanism. The movement mechanism 74 can be controlled in real-time by controlling the longitudinal displacement of an actuator arm 90 of the actuator 76 and thus the movement of the throttle gate 72 between the open and closed positions. As with the exit wing actuator 54, the actuator is secured to the solder pot 30 by the actuator support frame 58. The throttle gate actuator 76 is positioned next to the exit wing actuator 54 and forms part of the assembly to adjust a position of the throttle gate 72. The actuator 76 includes the actuator arm 90 that is coupled to the linkage by an actuator block 92.

As with the exit wing actuator 54, the throttle gate actuator 76 is a linear actuator, so the actuator arm 90 moves in a longitudinal direction. The actuator block 92 connects the actuator arm 90 to a connecting link 94 of the linkage to transfer movement from the actuator arm to the connecting link. The other end of the connecting link 94 is secured to the front wall 84 of the movement mechanism 74. Thus, longitudinal movement of the actuator arm 90 moves the actuator block 92 and the connecting link 94 in the same longitudinal direction as the actuator arm. In some embodiments, the actuator 76 and the connecting link 94 are oriented so the actuator arm 90 moves the connecting link in a horizontal direction. In certain embodiments, the actuator 76 includes an electromechanical actuator that provides movement for the adjustment of the position of the throttle gate 72. The actuator 76 is driven by computer controlled machine software (supported by the controller 26) and incorporates an encoder that can relay position indication to the machine software. Via the controller 26, the actuator 76 can be controlled in real-time to achieve a desired position of the throttle gate 72. The controller 26 is in communication with the actuator 76 and is configured to cause the actuator to adjust the position of the throttle gate 72 during operation of the wave soldering machine 10. In turn, the actuator 76 is configured to receive commands from the controller 26 to cause the actuator 76 to adjust the position of the throttle gate 72 during operation of the wave soldering machine 10.

The side wall 88 of the movement mechanism 74 is coupled to the arm 80 of the throttle gate 72. As best shown in FIG. 5, the outwardly extending pin 82 extends through a slot 96 formed in the side wall 88. As mentioned above, the other side wall 86 may or may not be similarly constructed. The arrangement is such that lateral (horizontal) movement of the movement mechanism 74 causes the throttle gate 72 to move between its opened and closed positions. Each side wall 86, 88 further includes two slots formed therein, each of which receives a pin to guide movement of the movement mechanism 74 with respect to the wave solder nozzle assembly 36. The connecting link 94 is secured to the front wall 84 of the movement mechanism 74. Thus, when the connecting link 94 is extended by the throttle gate actuator 76, the front wall 84 of the movement mechanism 74 is positioned against the second longitudinal side wall 46 of the nozzle core frame. In this position, the throttle gate 72 is in the open position. When the connecting link 94 is retracted by the throttle gate actuator 76, the front wall 84 of the movement mechanism 74 is spaced from the second longitudinal side wall 46 of the nozzle core frame. In this position, the throttle gate 72 is in the closed position.

The longitudinal displacement of the actuator arm 90 is able to cause the throttle gate 72 to rotate about the hinge pin 78. An axial direction of the actuator arm 90 is parallel with an axial direction of the connecting link 94. Thus, the actuator arm 90 is configured to move the connecting link 94 along the horizontal direction along the axis of the direction of the actuator arm. Because the front wall 84 of the movement mechanism 74 is coupled to the connecting link 94, extension or retraction of the actuator arm 90 results in translation of the movement mechanism.

Figure 10:
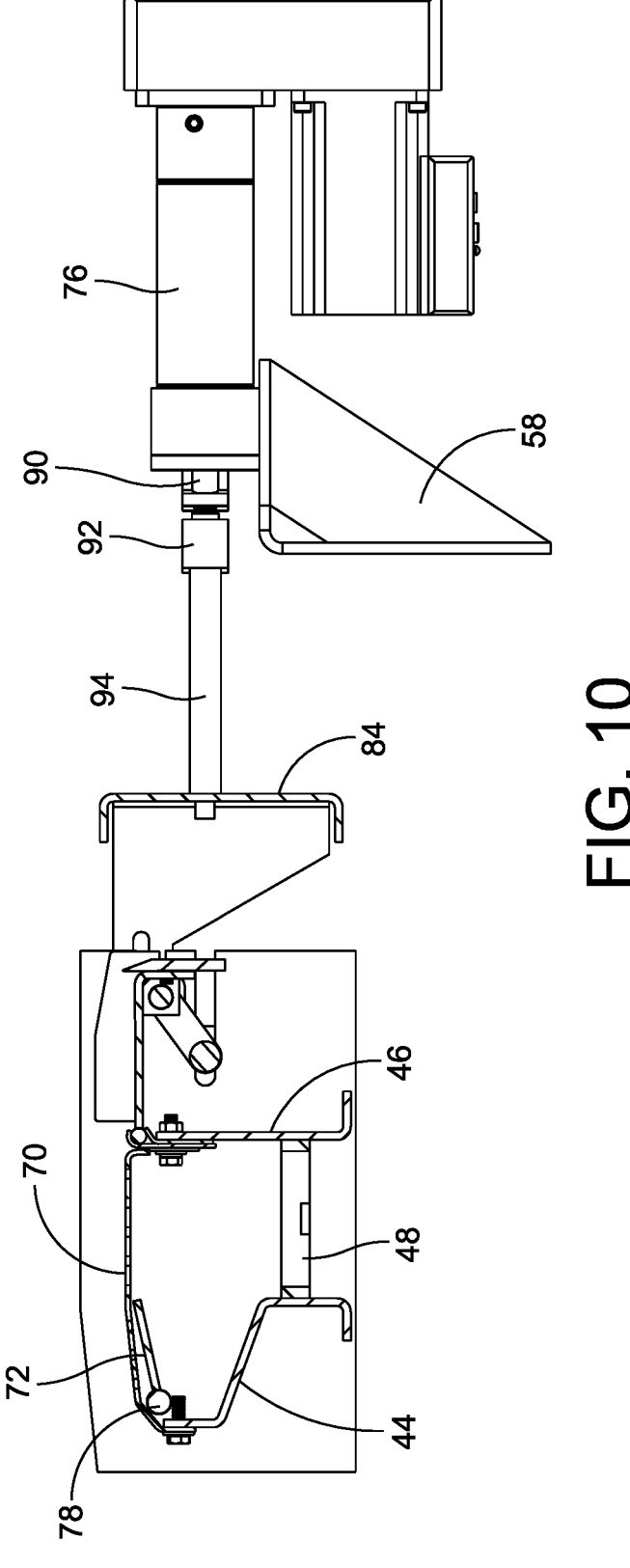
FIG. 10 is a side view of the wave soldering assembly showing a throttle gate in a closed position.
Figure 11:
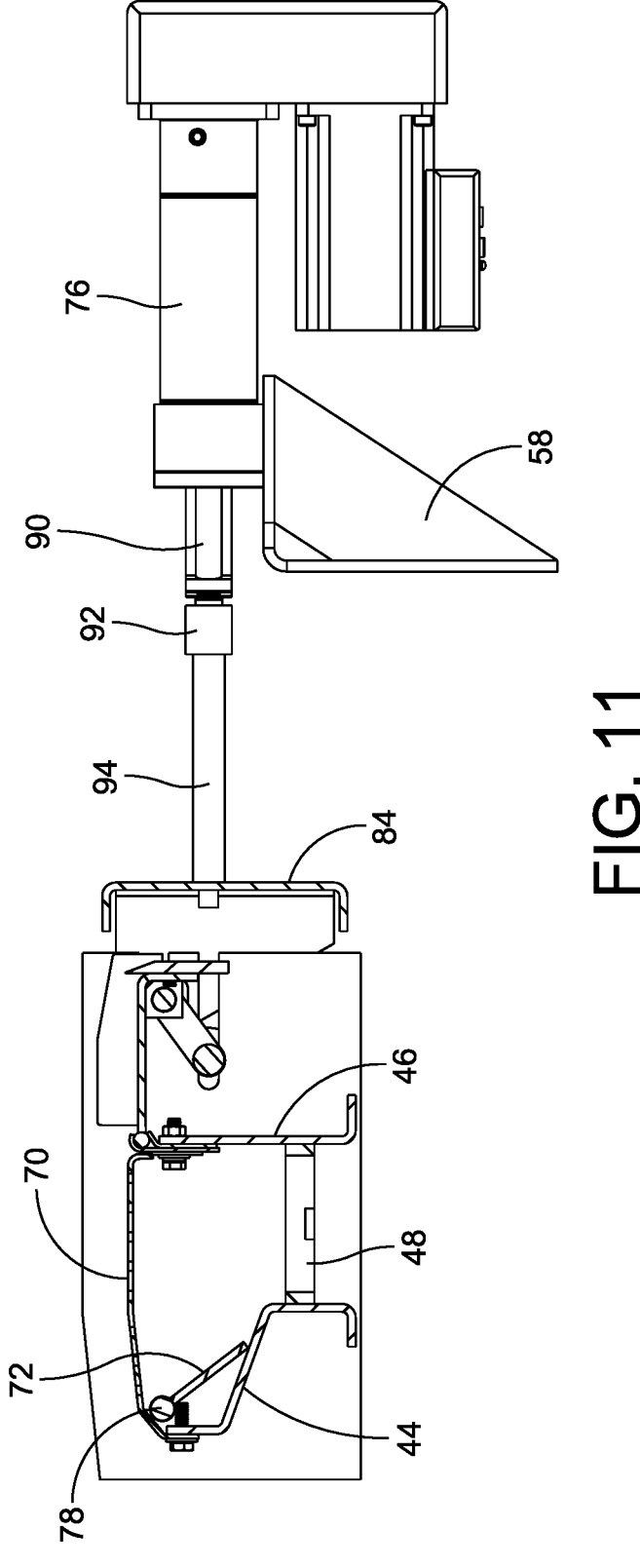
FIG. 11 is a side view of the wave soldering assembly showing the throttle gate in an open position.
Figure 12:
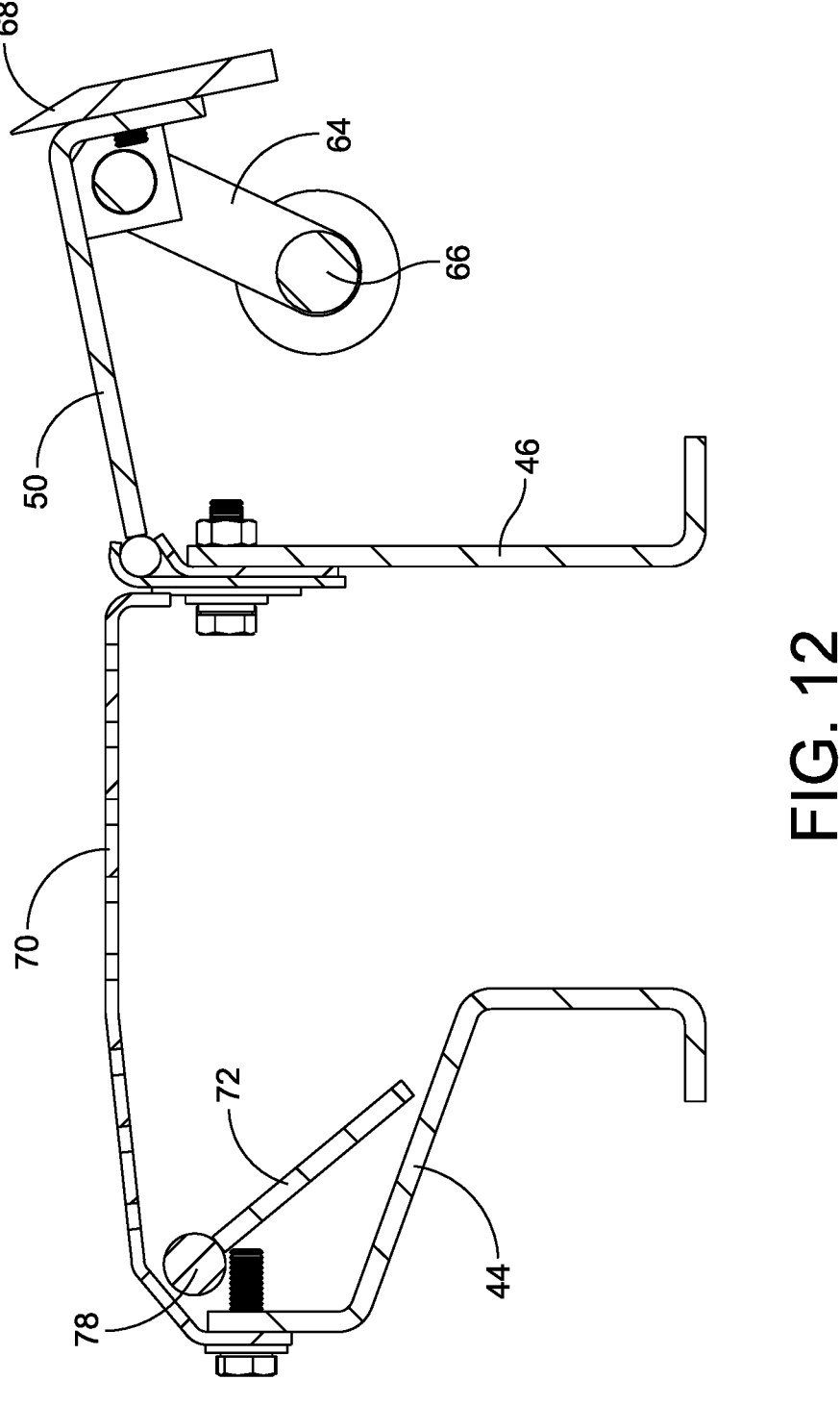
FIG. 12 is an enlarged cross-sectional view of the exit wing in the raised position and the throttle gate in the open position.
Figure 13:
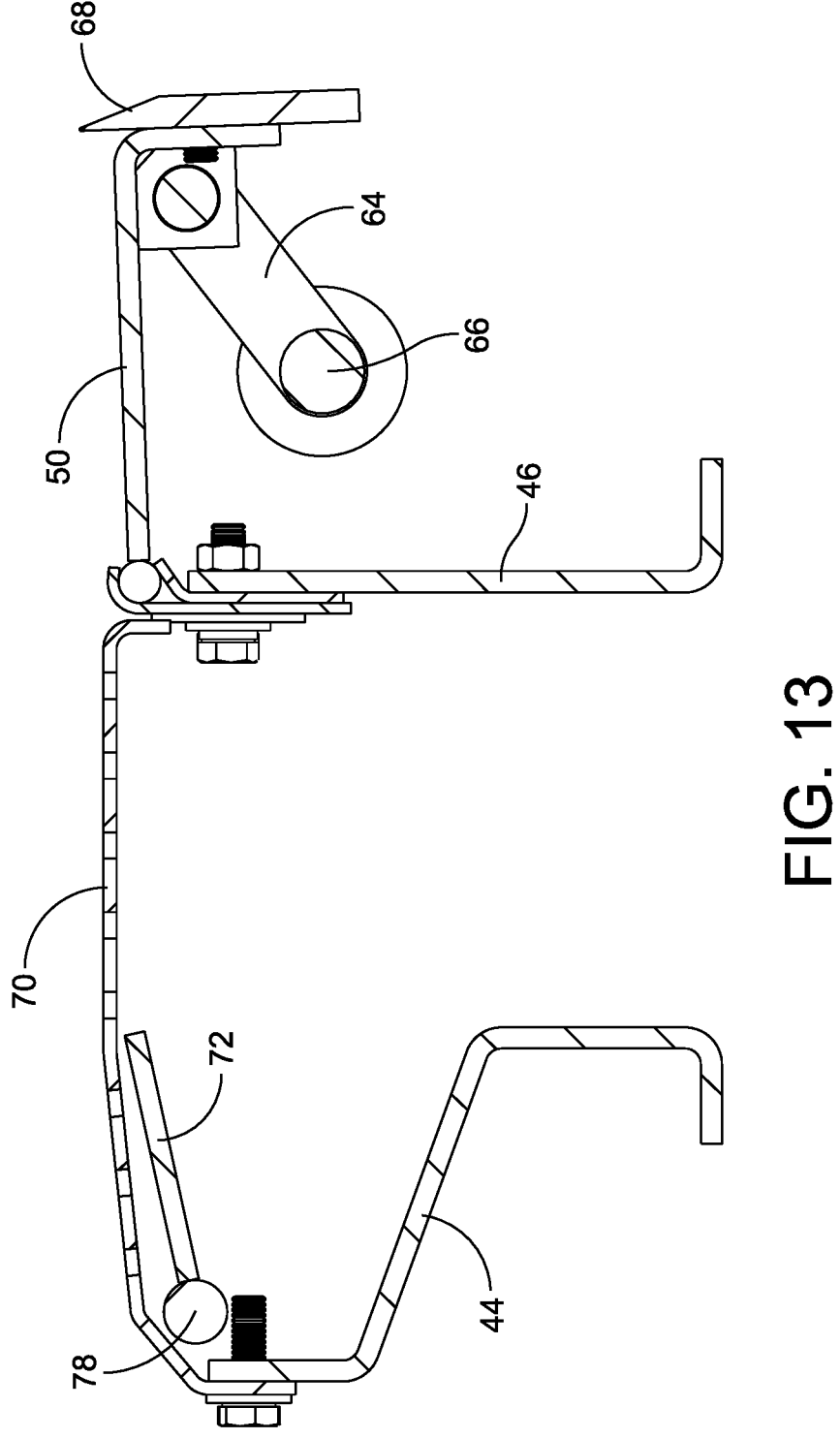
FIG. 13 is an enlarged cross-sectional view of the exit wing in the lowered position and the throttle gate in the closed position.

Referring to FIGS. 10 and 11, the actuator arm 90 associated with the throttle gate actuator 76 is shown in a retracted position in FIG. 10 and in an extended position in FIG. 11. Referring additionally to FIGS. 12 and 13, FIGS. 11 and 12 show the throttle gate 72 in the open position. FIGS. 10 and 13 show the throttle gate 72 in the closed position. The controller 26 is configured to adjust the position of the throttle gate 72 to control the flow of solder through the solder distribution baffle 70 thereby optimizing solder contact time. The controller 26 is configured to achieve optimum soldering characteristics of the wave nozzle assembly 36. As previously described, along with controlling the operation of the exit wing 50, the control of the throttle gate 72 assists in achieving optimal soldering characteristics.

As mentioned above, the first actuator 54 is configured to control the exit wing 50 to control the flow of solder over the back gate 68 of the exit wing to optimize solder joint formation. This feature reduces solder bridging defects during the wave soldering process. The second actuator 76 is configured to control the throttle gate 72 to control flow through the solder distribution baffle 70 to optimize solder contact time. This feature reduces copper dissolution during the wave soldering process.

Figure 14:
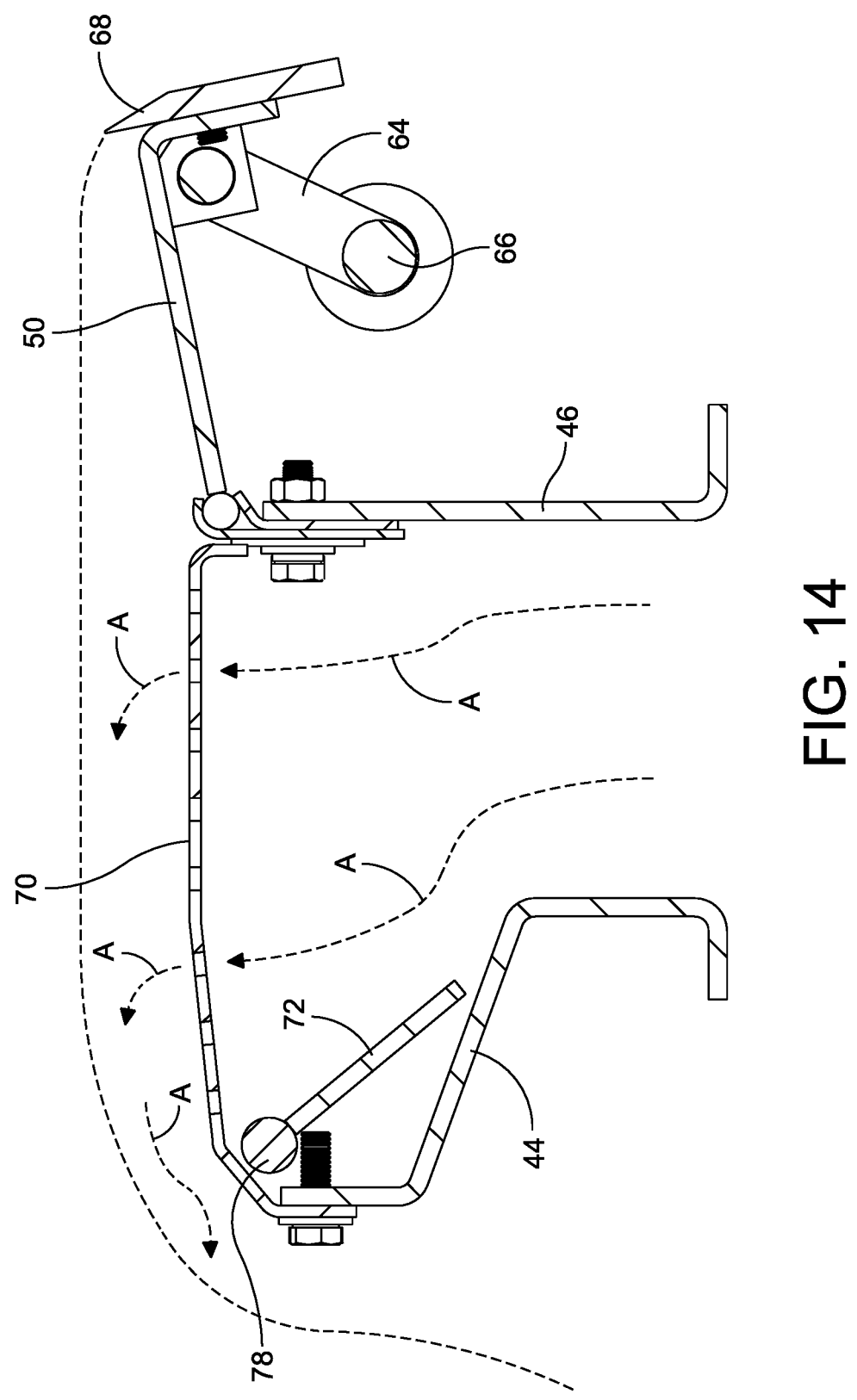
FIG. 14 is a cross-sectional view similar to FIG. 12 showing flow of solder through the wave soldering assembly.

Referring to FIG. 14, the second actuator 76 is extended thereby rotating the throttle gate 72 to the open position. By opening the throttle gate 72, solder flow indicated by arrows A through the solder distribution baffle 70 is increased, thereby resulting in extended contact time of the printed circuit board travelling over the solder wave. Further, the first actuator 54 is retracted thereby pivoting the exit wing 50 to the raised position. The exit wing 50 is raised due to the increased solder flow caused by the open throttle gate 72.

Figure 15:
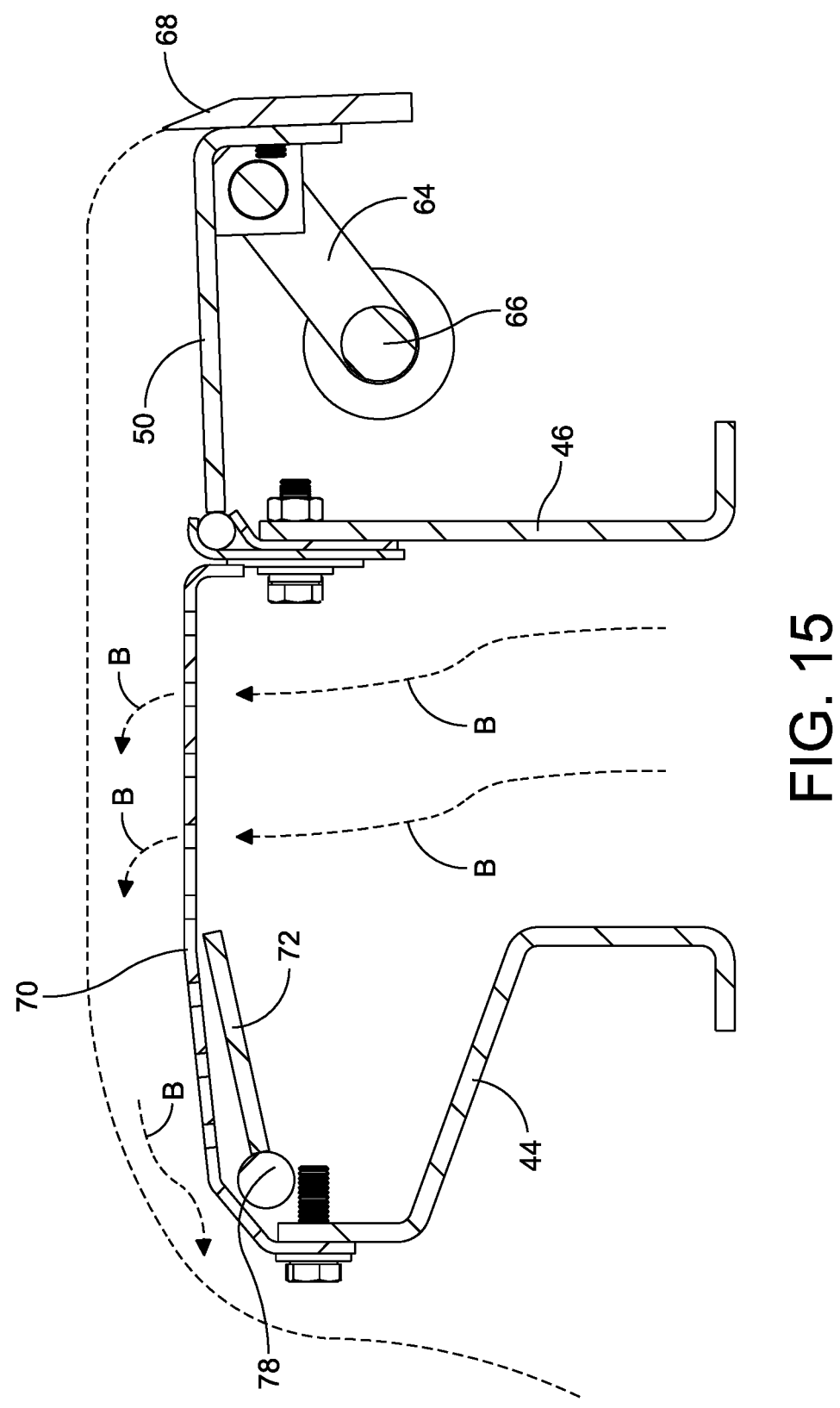
FIG. 15 is a cross-sectional view similar to FIG. 13 showing flow of solder through the wave soldering assembly.

Referring to FIG. 15, the second actuator 76 is retracted thereby rotating the throttle gate 72 to the closed position. By closing the throttle gate 72, solder flow indicated by arrows B through the solder distribution baffle 70 is reduced, thereby resulting in a reduction of contact time of the printed circuit board travelling over the solder wave. Further, the first actuator 54 is extended thereby pivoting the exit wing 50 to the lowered position. The exit wing 50 is lowered due to the decreased solder flow caused by the closed throttle gate 72.

Figure 16:
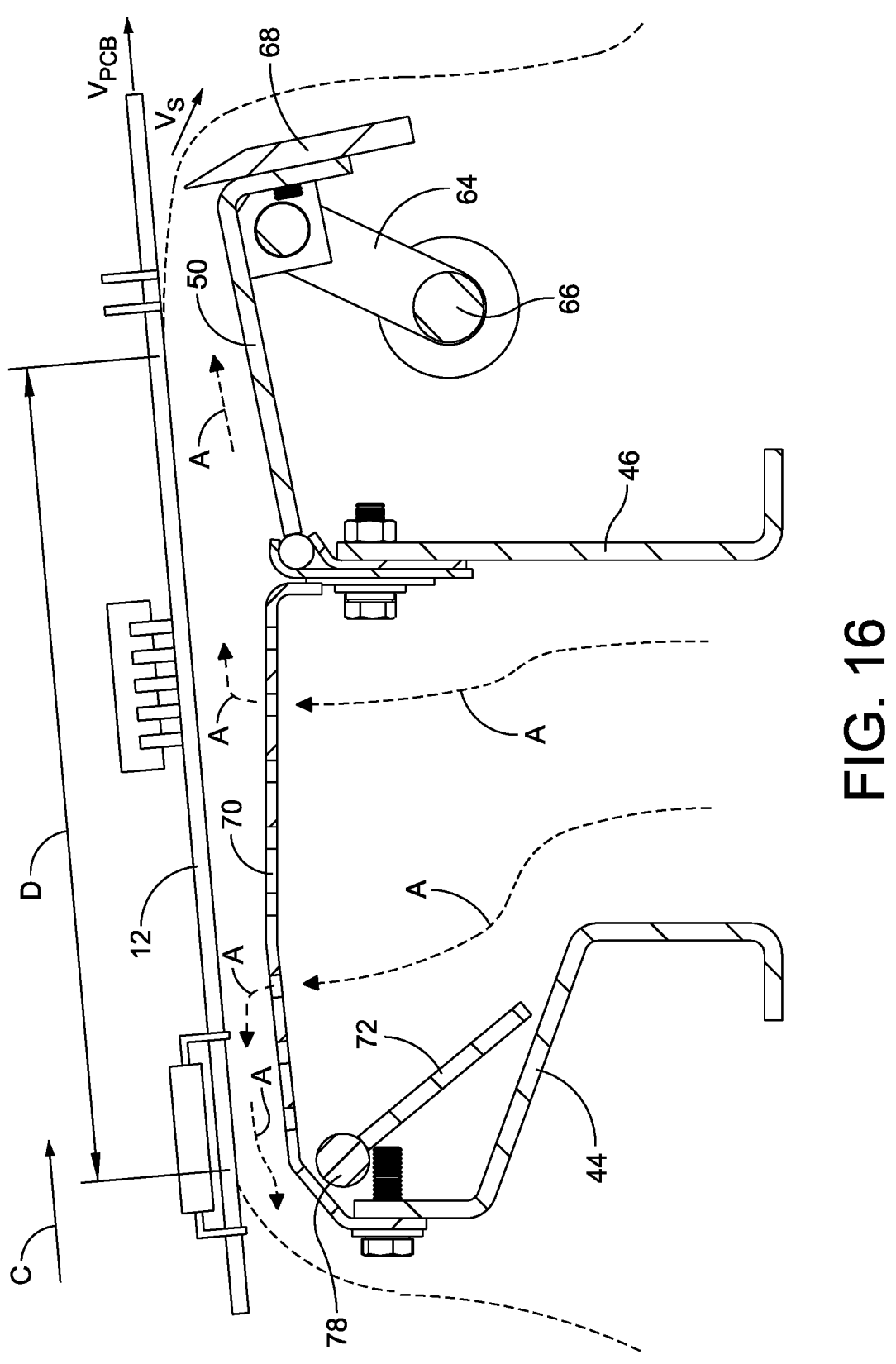
FIG. 16 is a cross-sectional view similar to FIGS. 12 and 14 showing flow of solder through the wave soldering assembly and a printed circuit board passing over a solder wave.

Referring to FIG. 16, which illustrates the throttle gate 72 in the open position and the exit wing 50 in the raised position shown in FIG. 14, a printed circuit board is shown travelling over the solder wave along direction C. As discussed above, the printed circuit board 12 travels over the solder wave for a maximum contact length D. The throttle gate 72 and the exit wing 50 are controlled (as by controller 26) to match the velocity of the printed circuit board (Vpcb) to the velocity of the flow of solder (Vs). As previously discussed, when these two velocities (Vpcb and Vs) are equal, the potential for soldering defects, particularly solder bridging, is greatly reduced. When velocities are not optimized, the resulting defects may require rework or scrap.

Figure 17:
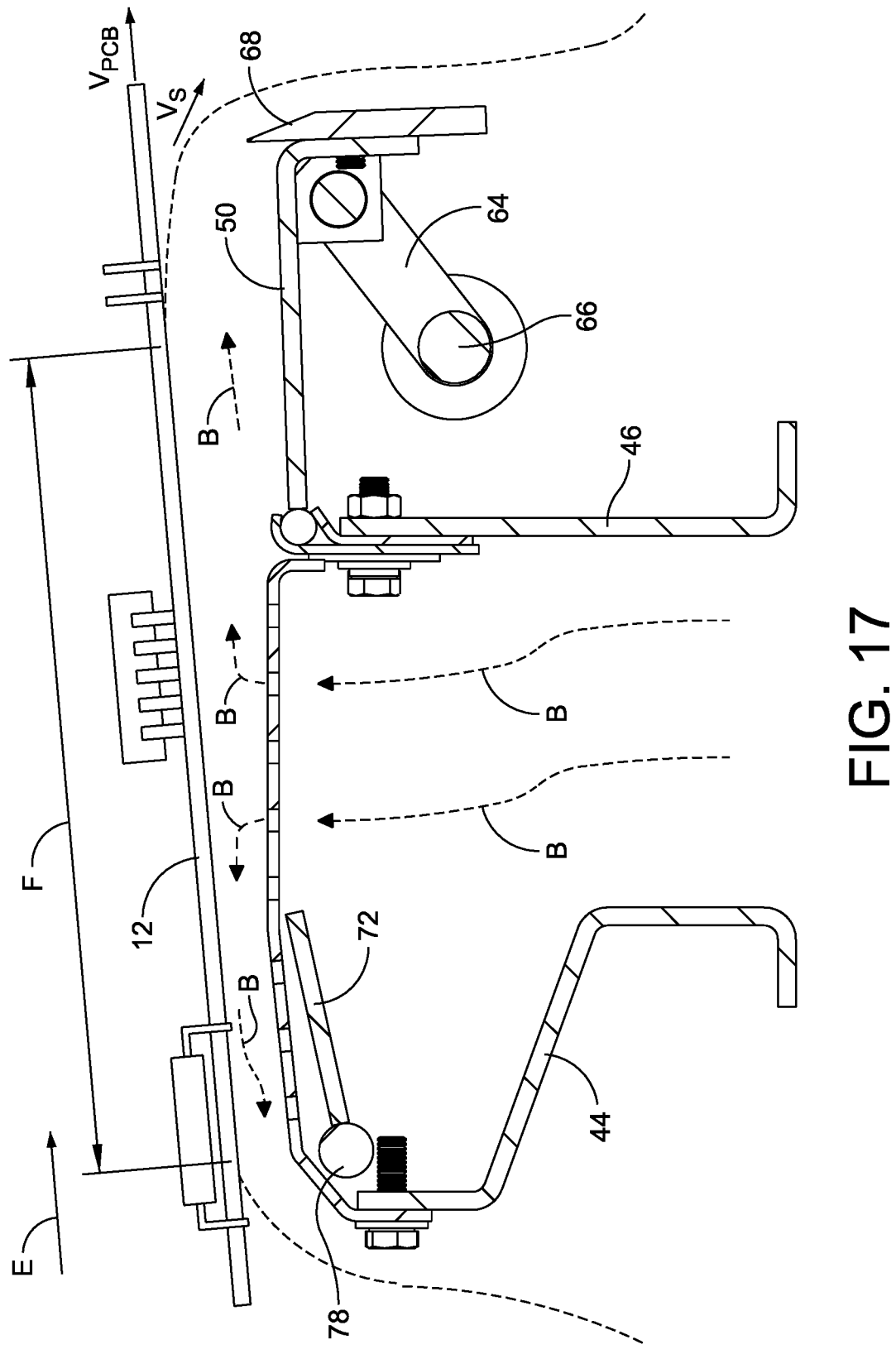
FIG. 17 is a cross-sectional view similar to FIGS. 13 and 15 showing flow of solder through the wave soldering assembly and the printed circuit board passing over the solder wave.

Referring to FIG. 17, which illustrates the throttle gate 72 in the closed position and the exit wing 50 in the lowered position shown in FIG. 15, a printed circuit board 12 is shown travelling over the solder wave along direction E. As discussed above, the printed circuit board 12 travels over the solder wave for a minimum contact length F. The throttle gate 72 and the exit wing 50 are controlled (as by controller 26) to match the velocity of the printed circuit board (Vpcb) to the velocity of the flow of solder (Vs).

In some embodiments, the wave solder nozzle assembly 36 further includes a dross damper that is secured to the nozzle frame and configured to reduce turbulence as the solder travels back to the reservoir 32, thereby reducing solder balls that can form within the reservoir. One or more nitrogen tubes can be provided to create an inert atmosphere during the wave soldering process.

In some embodiments, a shroud extends around the wave solder nozzle assembly 36. In some embodiments, the shroud surrounds the wave solder nozzle assembly to create a substantially gas impermeable, inert atmosphere surrounding the solder wave. In some embodiments, the shroud is substantially nitrogen impermeable. The shroud includes two sealed openings through which the connecting links extend. Each sealed opening has an inner surface that is in substantial sealing engagement with an outer surface of a respective one of the connecting links. Because each connecting link has a substantially constant cross section over a portion of the connecting link that passes through the sealed opening, the connecting link is able to substantially form a gas impermeable seal with the inner surface of the respective sealed opening. In some embodiments, the inner surface of each sealed opening is annular and the outer surface of each connecting link has a matching circular profile so the inner surface is in substantial sealing engagement with the outer surface as each connecting link moves along an axial direction of the connecting link through the sealed opening.

The present disclosure also provides a method of adjusting a flow of a solder wave of a wave solder nozzle assembly of a wave soldering machine. In some embodiments, the method can be performed using the wave soldering station 24 or the wave soldering machine 10 including the wave soldering station 24 described above.

In some embodiments, the method comprises delivering solder material to the wave solder nozzle assembly 36 including the nozzle core frame and an exit wing hingedly attached to the nozzle core frame, adjusting the flow of the solder wave by causing the linear actuator connected to the exit wing to adjust the orientation of the exit wing with respect to the nozzle core frame, and performing a wave soldering operation on a printed circuit board.

In some embodiments, adjusting the flow of the solder wave is achieved by rotating the exit wing with respect to the nozzle core frame by the linkage coupled to the linear actuator and the exit wing. In some embodiments, the linkage includes the connecting links and the rotating links, and the method includes causing translational movement of the connecting links along an operational axis of the linear actuator to cause a rotation of the rotating links.

In some embodiments, the method includes creating a substantially gas impermeable atmosphere over the solder wave. In some embodiments, this is accomplished by the shroud that surrounds the wave soldering station 24. The shroud includes at least one sealed opening through which a respective connecting link of the linkage extends. In some embodiments, the shroud includes two sealed openings. A first one of the connecting links extends through a first one of the sealed openings and a second one of the connecting links extends through a second one of the sealed openings. The inner surface of each sealed opening is in substantial sealing engagement with the outer surface of the respective connecting link.

In some embodiments of the method, the actuators are coupled to the controller 26 to control the movement of the linear actuators.

As used herein, "solder wave height" describes a vertical dimension of the solder wave.

Various controllers may execute various operations discussed above. For example, as discussed above, the controller, such as controller 26, may control the components of the wave soldering machine 10 including the wave soldering station 24, amongst other operations. Using data stored in associated memory and/or storage, the controller may execute one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

With each embodiment, solder flow through the nozzle can be controlled to reduce and even prevent dross recirculation through the nozzle. By reducing the width of the solder wave, dross is reduced. Each embodiment enables the width of the solder wave to be reduced.

In some embodiments, the wave soldering nozzle assembly further includes a dross box that is secured to the nozzle frame and configured to reduce turbulence as the solder travels back to the reservoir, thereby further reducing solder balls that can form within the reservoir.

In some embodiments, one or more nitrogen tubes can be provided to create an inert atmosphere during the wave soldering process.

In some embodiments, the minimum and the maximum contact can be varied.

As used herein, "solder wave width" describes a cross-sectional dimension of the actual solder wave and "contact length" describes a distance on a PCB that is in contact with the wave at any given point in time. The word "length" as used herein references contact length that is parallel to the direction of travel of the PCB. The word "height" as used herein references a height of the solder wave above the solder distribution baffle.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A wave soldering machine to perform a wave soldering operation on a printed circuit board, the wave soldering machine comprising:

a housing;

a conveyor coupled to the housing, the conveyor being configured to deliver a printed circuit board through the housing; and a wave soldering station coupled to the housing, the wave soldering station including a solder pot having a reservoir of solder material, a flow duct positioned in the reservoir of the solder pot, and a wave soldering nozzle assembly coupled to the flow duct, the wave soldering nozzle assembly having a nozzle core frame, a solder distribution baffle coupled to the nozzle core frame, the solder distribution baffle being configured to create a solder wave, a throttle gate assembly coupled to the nozzle core frame and configured to rotate from an open position to enable complete flow of solder through the solder distribution baffle and a closed position to inhibit a portion of flow of solder through the solder distribution baffle, and an exit wing coupled to the nozzle core frame and configured to move from a lowered position to enable increased solder flow and a raised position to decrease solder flow, wherein the throttle gate assembly includes a throttle gate plate hingedly secured to the nozzle core frame on a load side of the wave soldering nozzle assembly, the throttle gate plate being configured to rotate between the closed and opened positions, a movement mechanism coupled to the throttle gate plate, and an actuator coupled to the movement mechanism, the actuator and the movement mechanism being configured to rotate the throttle gate plate between the open and closed positions.

2. The wave soldering machine of claim 1, wherein the nozzle core frame is supported by the flow duct and configured to support the solder distribution baffle.

3. The wave soldering machine of claim 2, wherein the exit wing is rotatable about a hinge with respect to the nozzle core frame to move the exit wing between the lowered position and the raised position.

4. The wave soldering machine of claim 3, wherein the wave solder nozzle assembly further includes an exit wing actuator connected to the exit wing, the exit wing actuator being configured to adjust the position of the exit wing between the lowered position and the raised position.

5. The wave soldering machine of claim 4, wherein the exit wing actuator is connected to the exit wing by a linkage, the linkage including at least one rotating link having a first end rotatably coupled to an end of the exit wing and a second end that is rotatably coupled to an actuator arm of the exit wing actuator.

6. The wave soldering machine of claim 5, wherein the linkage further includes a cross bar extending perpendicularly to and being rotatably coupled to the at least one rotating link, and at least one connecting link coupling the cross bar to the actuator arm and extending perpendicularly to cross bar, the at least one connecting link being connected to the actuator arm by an actuator block.

7. The wave soldering machine of claim 4, wherein the throttle gate assembly further includes a hinge pin configured to hingedly secure the throttle gate plate to the nozzle core frame.

8. The wave soldering machine of claim 7, wherein the movement mechanism of the wave soldering nozzle assembly further includes a generally U-shaped structure having a front wall and two side walls, the movement mechanism being configured to move laterally with respect to the nozzle core frame to cause the throttle gate plate to rotate, the wave soldering nozzle assembly further including a link secured to the movement mechanism that is coupled to the throttle plate.

9. The wave soldering machine of claim 8, wherein the movement mechanism is coupled to an arm secured to the hinge pin of the throttle gate.

10. A wave soldering station of a wave solder machine configured to perform a wave soldering operation on a printed circuit board, the wave soldering station comprising:

a solder pot having a reservoir of solder material;

a flow duct positioned in the reservoir of the solder pot; and a wave soldering nozzle assembly coupled to the flow duct, the wave soldering nozzle assembly having a nozzle core frame, a solder distribution baffle coupled to the nozzle core frame, the solder distribution baffle being configured to create a solder wave, a throttle gate assembly coupled to the nozzle core frame and configured to move from an open position to enable complete flow of solder through the solder distribution baffle and a closed position to inhibit a portion of flow of solder through the solder distribution baffle, and an exit wing coupled to the nozzle core frame and configured to move from a lowered position to enable increased solder flow and a raised position to decrease solder flow, wherein the throttle gate assembly includes a throttle gate plate hingedly secured to the nozzle core frame on a load side of the wave soldering nozzle assembly, the throttle gate plate being configured to rotate between the closed and opened positions, a movement mechanism coupled to the throttle gate plate, and an actuator coupled to the movement mechanism, the actuator and the movement mechanism being configured to rotate the throttle gate plate between the open and closed positions.

11. The wave soldering station of claim 10, wherein the nozzle core frame is supported by the flow duct and configured to support the solder distribution baffle.

12. The wave soldering station of claim 11, wherein the exit wing is rotatable about a hinge with respect to the nozzle core frame to move the exit wing between the lowered position and the raised position.

13. The wave soldering station of claim 12, wherein the wave solder nozzle assembly further includes an exit wing actuator connected to the exit wing, the exit wing actuator being configured to adjust the position of the exit wing between the lowered position and the raised position.

14. The wave soldering station of claim 13, wherein the exit wing actuator is connected to the exit wing by a linkage, the linkage including at least one rotating link having a first end rotatably coupled to an end of the exit wing and a second end that is rotatably coupled to an actuator arm of the exit wing actuator.

15. The wave soldering station of claim 14, wherein the linkage further includes a cross bar extending perpendicularly to and being rotatably coupled to the at least one rotating link, and at least one connecting link coupling the cross bar to the actuator arm and extending perpendicularly to cross bar, the at least one connecting link being connected to the actuator arm by an actuator block.

16. The wave soldering station of claim 13, wherein the throttle gate assembly further includes a hinge pin configured to hingedly secure the throttle gate plate to the nozzle core frame.

17. The wave soldering station of claim 16, wherein the movement mechanism of the wave soldering nozzle assembly further includes a generally U-shaped structure having a front wall and two side walls, the movement mechanism being configured to move laterally with respect to the nozzle core frame to cause the throttle gate plate to rotate, the wave soldering nozzle assembly further including a link secured to the movement mechanism that is coupled to the throttle plate.

18. The wave soldering station of claim 17, wherein the movement mechanism is coupled to an arm secured to the hinge pin of the throttle gate.

19. A method of adjusting a flow of a solder wave of a wave solder nozzle assembly of the wave soldering machine of claim 1, the method comprising:

delivering solder material to the wave solder nozzle assembly;

adjusting a flow of the solder wave by the throttle gate actuator connected to the throttle gate plate by the movement mechanism to adjust the position of the throttle gate plate and by the exit wing actuator coupled to the exit wing to adjust a position of the exit wing with respect to the nozzle core frame; and performing a wave soldering operation on a printed circuit board.

20. The wave soldering machine of claim 1, further comprising a controller coupled to the wave soldering station to control the movement of the throttle gate assembly and the exit wing to control the flow of solder, the controller being configured to control movement of the throttle gate assembly to the open position and movement of the exit wing to the raised position to achieve a maximum contact length and to control movement of the throttle gate to the closed position and movement of the exit wing to the lowered position to achieve a minimum contact length.

21. The wave soldering machine of claim 20, wherein the controller further is configured to control movement of the throttle gate and the exit wing to control a velocity of the flow of solder of the solder wave to match a velocity of the printed circuit board traveling over the solder wave.

22. The wave soldering station of claim 10, wherein a controller, coupled to the wave soldering station, is configured to control the movement of the throttle gate assembly and the exit wing to control the flow of solder, the controller being configured to control movement of the throttle gate assembly to the open position and movement of the exit wing to the raised position to achieve a maximum contact length and to control movement of the throttle gate to the closed position and movement of the exit wing to the lowered position to achieve a minimum contact length.

23. The wave soldering station of claim 22, wherein the controller further is configured to control movement of the throttle gate and the exit wing to control a velocity of the flow of solder of the solder wave to match a velocity of the printed circuit board traveling over the solder wave.

* * * * *